(12) United States Patent
Chaiken et al.

(10) Patent No.: US 11,507,464 B2
(45) Date of Patent: Nov. 22, 2022

(54) SYSTEM AND METHOD TO IMPLEMENT A GUIDED RESOLUTION OF A NON-BOOTING INFORMATION HANDLING SYSTEM

(71) Applicant: Dell Products, LP, Round Rock, TX (US)

(72) Inventors: Craig L. Chaiken, Pflugerville, TX (US); Geroncio O. Tan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 206 days.

(21) Appl. No.: 17/082,582

(22) Filed: Oct. 28, 2020

(65) Prior Publication Data
US 2022/0129349 A1  Apr. 28, 2022

(51) Int. Cl.
G06F 9/44 (2018.01)
G06F 11/14 (2006.01)
G06F 9/4401 (2018.01)
G06F 9/451 (2018.01)

(52) U.S. Cl.
CPC ........ *G06F 11/1417* (2013.01); *G06F 9/4403* (2013.01); *G06F 9/4411* (2013.01); *G06F 9/453* (2018.02)

(58) Field of Classification Search
CPC .................................................. G06F 11/1417
USPC ........................................................... 714/36
See application file for complete search history.

(56) References Cited

U.S. PATENT DOCUMENTS

| 8,775,704 | B2 | 7/2014 | Frid |
| 9,329,923 | B2* | 5/2016 | Joshi ................... G06F 11/0787 |
| 9,652,251 | B2 | 5/2017 | Gillon |
| 10,365,961 | B2 | 7/2019 | Cady |
| 2016/0378603 | A1* | 12/2016 | Herzi .................. G06F 11/2284 |
| | | | 714/6.12 |

(Continued)

FOREIGN PATENT DOCUMENTS

WO   2007/127491 A2   11/2007

*Primary Examiner* — Timothy A Mudrick
(74) *Attorney, Agent, or Firm* — Prol Intellectual Property Law, PLLC; H. Kenneth Prol

(57) ABSTRACT

A method of instructing a user prior to a boot-up process of an information handling system may include, with an embedded controller (EC) of the information handling system, executing a guided diagnostic flow module to: determine that a power-on process has been initiated at the information handling system; determine whether the EC detected a power sequencing timeout during boot up; and determine at which power rail boot-up has hung during the power-on process; and where the EC either determines that the power sequencing timeout has occurred, determining a fault at an issue-experiencing hardware component operatively coupled to the determined power rail. The method may further include sending a message from the EC to a timing controller (TCON) of a display panel of the information handling system, to initiate a guided diagnostic flow, the guided diagnostic flow including: providing, at the display panel via the TCON, diagnostics steps from flash memory as instructions to the user of the information handling system to guide the user to perform a manual manipulation of the issue-experiencing hardware component of the information handling system to address the fault.

20 Claims, 7 Drawing Sheets

(56) References Cited

U.S. PATENT DOCUMENTS

2016/0378604 A1* 12/2016 Teshome ............ G06F 11/1417
714/36
2019/0278651 A1  9/2019 Thornley
2020/0233766 A1  7/2020 Chaiken

* cited by examiner

SYSTEM AND METHOD TO IMPLEMENT A GUIDED RESOLUTION OF A NON-BOOTING INFORMATION HANDLING SYSTEM

FIELD OF THE DISCLOSURE

The present disclosure generally relates to diagnosis and remediation of a non-booting information handling system or an information handling system experiencing booting problems. The present disclosure more specifically relates to displaying pre-boot error messages (e.g., using text or graphical images) providing diagnostic steps or results.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include an embedded controller that executes operations of the computing device not otherwise executed by a processor executing a Basic Input/Output System (BIOS). Failure to boot up or errors in boot process that require diagnosis in an information handling system can trigger return of the information handling system to the manufacturer or a shotgun approach to repair the information handling system often costing unnecessary money and time or wasting of parts that may not be damaged.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
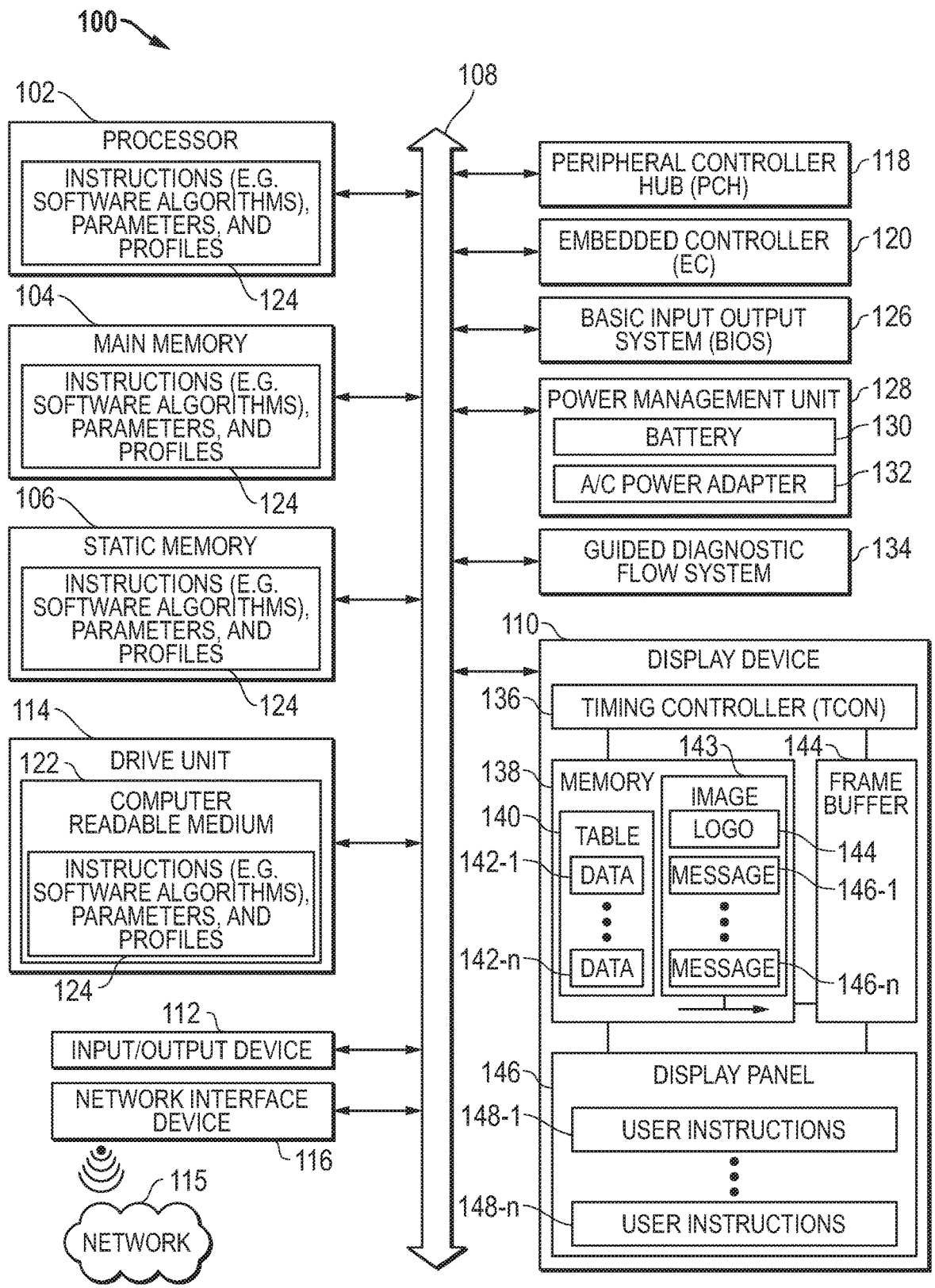
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for a user to be guided to resolving issues causing an information handling system to not boot up. When an information handling system fails to boot, diagnosing the cause usually requires a service manual and advanced troubleshooting skills that a common user of the information handling system may not have. This situation leaves the user with the options of "shotgun debugging," or sending the entire computer to the manufacturer or third-party repairman for repair. The term "shotgun debugging" refers to a process that a user may employ that includes guessing which of all the components of the information handling system that could be causing the boot-up issue, removing those allegedly issue-causing components, ordering new components, and replacing the old components with the new components. This approach results in unnecessary motherboard, panel, and other component replacements that costs millions of dollars a year for the user and/or manufacturer of the information handling system. The approach of returning the entire computer to the manufacturer or a third-party repairman for repair, for example, results in the customer being without a computer for an extended period.

The present specification, therefore, describes a method for diagnosis and notification to a user of issues and for a user to be guided to resolving issues that cause an information handling system to not boot up. The diagnoses and repairs of the information handling system may be, therefore, automated or performed by less skilled individuals if the information handling system itself provides a guided resolution as described herein.

In addition to providing diagnostic indicators via a display screen despite failure to boot, the present disclosure describes a method for a user to be guided to resolving issues that cause an information handling system to not boot up via display screen notifications provided by an alternative processing embedded controller (EC) managing diagnostics. The present specification provides step-by-step instructions, presented at a display device, that directs the user to manipulate any component of the information handling system that an embedded controller (EC) discovers may be the reason as to why the information handling system does not boot-up. In a specific example embodiment, the EC may detect that certain dual in-line memory modules (DIMMs) or M.2 components are not operating properly, causes a timing controller (TCON) of a display panel of the display device to present instructions to the user to remove the DIMM from a first slot, replace the DIMM into a second slot, and indicate to the information handling system, via a key press for example, that the manipulation was completed. This instruction process may be conducted any number of times in response to various diagnostic actions based on detected errors for various embodiments, until the EC has detected that the issue has resolved or all potential components have been checked. During this process, the EC may turn off power at a power rail to the components being manipulated until they are to be powered up again after receiving the key press from the user.

According to an embodiment of the present specification, the specification describes a method of instructing a user prior to a successful boot-up process of an information handling system. The method, in an embodiment, includes executing codes instructions of a guided diagnostic flow initiation module with an embedded controller (EC) of the information handling system. The execution of the code instructions of the guided diagnostic flow may determine that a power-on process has been initiated at the information handling system. Additionally, the execution of the guided diagnostic flow may determine whether the EC detected a power sequencing timeout or other error. The diagnostic flow module on the EC may determine whether an established hotkey has been actuated during the power-on process to initiate diagnostics in an embodiment. In an embodiment where the EC either determines that the power sequencing timeout has occurred or the hotkey was actuated, the method may include sending a message from the EC to a timing controller (TCON) of a display panel of the information handling system, to initiate a guided diagnostic flow. In an embodiment, the guided diagnostic flow includes providing, at the display panel via the TCON, diagnostics steps as instructions to the user of the information handling system to direct the user to perform a manual manipulation of an issue-experiencing hardware component of the information handling system to address the fault. In the present specification and in the appended claims, the term "address the fault" is meant to be understood as any action that corrects the operation of an issue-experiencing hardware component or further diagnose the fault or issue detected by the methods described herein. The encountered issue may be one where the EC circuitry detects that one more device, normally detectible by the EC at a power rail of the information handling system, is not detected, or where a power management unit (PMU) integrated circuit (IC) for an A/C power source or battery detects an unexpectedly large current increase or no current in some example embodiments.

In an embodiment, the I²C protocol, or a similar protocol, may be used to present instructions to the user at the display panel via the TCON. In this embodiment, the EC may instruct the TCON using the I²C protocol whether to display any number of instructions or directions to the user based on the EC detecting a power sequencing timeout, if any, indicating, in an embodiment, that a component of the information handling system is causing boot-up issues. Further, in some embodiments, providing diagnostics steps further includes presenting a description, via the display screen, that a first hardware component within the information handling system is to be manipulated. The EC may remove power to the first hardware component in anticipation of the user's manipulation of the first hardware component per a diagnostic step, and restoring power to the first hardware component after the EC receives a signal, via an input device, that the user has manipulated the first hardware component per the instructions presented on the display panel.

In some embodiments, the operations of the TCON may further include copying the one or more instructions stored on a flash memory device on the information handling system that is accessible to the TCON to create a composite bitmapped image on the display panel. This may be done by transferring the bitmapped image via a direct memory access to a frame buffer associated with the display panel.

In an embodiment, providing diagnostics steps further includes presenting a description, via the display screen, that a first hardware component within the information handling system is to be manipulated. In an embodiment, the EC may remove power to the first hardware component in anticipation of the user's manipulation of the first hardware component; and restoring power to the first hardware component after the EC receives a signal, via an input device, that the user has manipulated the first hardware component per the instructions presented on the display panel.

In an embodiment, determining whether a particular hardware component of a plurality of hardware components of the information handling system has encountered an issue further includes detecting a memory reference code from the BIOS to detect a memory error code at a memory component such as a dual in-line memory module (DIMM) operatively coupled to the EC. The EC executing a guided diagnostic flow may provide diagnostics steps as instructions to the user specific of moving the DIMM from a first slot to a second slot within the information handling system. The EC executing a diagnostic flow may receive a signal from an input device that the DIMM has been moved to an alternative slot within the information handling system, and reporting to the BIOS that the first slot is damaged upon detection that the DIMM is operable.

In an embodiment, determining whether a particular hardware component of a plurality of hardware components of the information handling system has encountered an issue may further include detecting a memory reference code from the BIOS representative of a detected memory error code at memory components such as a dual in-line memory module (DIMM) operatively coupled to the EC. The EC executing a diagnostic flow may provide diagnostics steps as instructions to the user that specifically describes how to move the DIMM from a first slot to a second slot within the information handling system. In an embodiment, the EC may receive a signal from an input device that the DIMM has been moved to an alternative slot within the information handling system. The EC executing a diagnostic flow may detect that the DIMM is operating currently in the second slot thereby indicating that the first DIMM slot had a short. The EC may then, in this example embodiment, reporting a DIMM socket short related to the first DIMM slot to the BIOS. It is understood that those actions performed during any guided diagnostic flow described herein also applies to other devices such as M.2 devices. These specific M.2 device examples may be any device that implements the M.2 specification used to mount those devices into the information handling system. In particular, certain expansion cards and associated connectors may be used to operatively couple devices to, for example, a motherboard and CPU within the information handling system. These certain expansion cards and associated connectors may be operated under the M.2 specifications that increase the transmission of data from one component to another using connectors that are relatively smaller and take up less space within the information handling system. These devices that implement this M.2 specification use specific types of connectors that facilitate the operative coupling of the devices to each other and, per the methods described herein, may be subjected to the methods of the EC executing the diagnostic flow similar to that described in connection with the DIMM and its slots. In the examples M.2-type devices and connectors may operate under, for example, a PCIe 3.0 standards, PCIe 4.0 standard, SATA 3.0 standard, USB 3.0 standard, and the like.

In an embodiment, the EC executing a diagnostic flow instructions may cause a display screen or device to present a first instruction to the user to direct the user to perform a manual manipulation of a first issue-experiencing hardware component of the information handling system. In this embodiment, the EC may have detected that a specific device (e.g., a memory device, a connector, a processor, a wire, peripheral device, among others) has an issue as described herein. The EC may then, upon execution of the diagnostic flow instructions, remove power from the first issue-experiencing hardware component in order for the user to manually manipulate the first issue-experiencing hardware component. The EC may then, upon execution of the diagnostic flow instructions, receive a signal that the user has completed the manipulation and may then recheck the first issue-experiencing hardware component to determine whether issues still remain in relation to the operation of the first issue-experiencing hardware component. Where no issue remains in relation to the operation of the first issue-experiencing hardware component, the EC may then, upon execution of the diagnostic flow instructions, check the operation of a second hardware component to determine if the second hardware component has an operational issue as well. This process may be completed for all hardware components within the information handling system in an embodiment. In another embodiment, the EC may execute the diagnostic flow instructions to direct the user to manually manipulate those hardware components where the EC has determined that those hardware components are experiencing issues.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices 112, such as a keyboard, a mouse, a video/graphic display 110, or any combination thereof. The information handling system 100 can also include one or more buses 108 operable to transmit communications between the various hardware components. Portions of an information handling system 100 may themselves be considered information handling systems 100.

Information handling system 100 can include devices or modules that embody one or more of the devices or execute code instructions 124 for the one or more systems and modules via one or more processing resources described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same as processing resources. Additional processing resources for executing instructions according to embodiments herein may include one or more embedded controllers (ECs) 120 or timing controllers (TCON) 136 capable of operation with or without other processors such as a booted CPU or graphical processing unit (GPU). Any of the processing resources may operate to execute code that is either firmware or software code. Moreover, the information handling system 100 can include memory such as main memory 104, static memory 106, computer readable medium 122 storing instructions 124 of the guided diagnostic flow module 134, and drive unit 114 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices 112.

The information handling system 100 may further include a display device 110. The display device 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input, and a keyboard). The information handling system 100 can also include a disk drive unit 114.

The display device 110 may include a timing controller (TCON) 136. The TCON 136 may receive signals from the EC 120 descriptive of which of a plurality of messages are to be presented on the display panel 146 of the display device 110 according to embodiments herein. In order to facilitate this, the TCON 136 may access a memory 138 may include a data structure, such as a table 140 or similar, that is used to store multiple data items 142-1 to 142-n. The data items 142-1 to 142-n may include, for example, visual graphics depicting diagnostic messages, graphics, or instructions related to manipulating the components of the information handling system 100, error messages 146-1 to 146-n, error codes, logos 144, and the like. In a specific embodiment, the data items 142-1 to 142-n may reference specific error codes that elicit specific error messages 146-1 to 146-n, logos 144, and specific images to include as an image 143 generated via the execution of the TCON 236.

The display device 110 may further include a frame buffer 144. As described in more detail herein, the frame buffer 144 may receive an image of a splash screen (e.g., a device manufacturer's logo, such as for Dell®) assembled using data stored in a flash memory that is accessible to the TCON. Similarly, diagnostic and error messages may be stored in the flash memory that is accessible to the TCON. In an embodiment, the splash screen may include any text or images that instruct the user to manipulate the devices within the information handling system that may be accessed at prompting by the EC 120 executing the guided diagnostic flow system 134. In specific examples, the images maintained by the frame buffer 144 and presented on the display panel 146 as a series of user instructions 148-1 through 148-n may include instructions to access the devices that are causing boot up issues. This may include one or a series of splash screens that instruct the user on how to disassemble the information handling system in order to access the device. Still further, the user may actuate a key or button to progress through a series of steps of disassembly in order to receive further instructions 148-1 through 148-n regarding where the device is located within the information handling system and how to manipulate (e.g., remove, replace, adjust, move) the device. In some specific embodiments, an image presented to the display panel 146 may include images depicting components such as a chassis or motherboard and a blinking portion around a portion of the image that indicates to the user where the device can be found. The images presented to the user may be any of a line drawing, a photo quality image, or some other detailed image of the device, boards, components, or other portions within the information handling system. Some portions of the image presented by the frame buffer 144 may be caused to blink, reverse contrast, show a different color, or otherwise highlight the device image thereby further directing the user's attention to the device to be manipulated.

In an embodiment, the display device 110 may be communicatively coupled to an embedded controller (EC) 120. The EC 120 may interact with the components of the display device 110 via the TCON 136 in order to present to a user images and text that visually instruct a user as to how to manipulate components of the information handling system 100. These components may include any components that prevent the information handling system 100 from executing a boot-up process as detected by the EC 120 as described herein. Occasionally, the components of the information handling system 100 may fail for a myriad of reasons and, during an attempted boot-up process, may cause the boot-up process to fail. In order to execute the guided diagnostic flows described herein, the guided diagnostic flow module 134 may, when executed by the EC 120, display any number of messages to the user at the display device 110 via the TCON 136 that describe to the user how to complete the diagnostic process. The number of these messages may vary based on the number of components present in the information handling system 100 as well as which of those components, as detected by the EC 120, may be experiencing issues that prevent the boot-up of a BIOS 126 of the information handling system 100.

The network interface device 116 may provide connectivity to a network 115, e.g., a wide area network (WAN), a local area network (LAN), wireless local area network (WLAN), a wireless personal area network (WPAN), a wireless wide area network (WWAN), or other networks. Connectivity may be via wired or wireless connection. The network interface device 116 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 116 may operate two or more wireless links.

The network interface device 116 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 115 can communicate voice, video or data over the network 115. Further, the instructions 124 may be transmitted or received over the network 115 via the network interface device or other wireless adapter.

The information handling system 100 can include a set of instructions 124 that can be executed to cause the computer system to perform any one or more of the methods or computer-based functions disclosed herein. For example, instructions 124 may execute a guided diagnostic flow module 134, table 140 accesses, image 142 displaying, instructions to display user instruction 148-1 to 148-n, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 114 and the guided diagnostic flow module 134 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 114 and static memory 106 may also contain space for data storage. Further, the instructions 124 may embody one or more of the methods or logic as described herein. For example, instructions relating to the guided diagnostic flow module 134 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the guided diagnostic flow module 134 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium, such as NOR or NAND flash memory in some example embodiments. The guided diagnostic flow module 134 may be stored in a static memory 106, or the drive unit 114 on a computer-readable medium 122 such as a flash memory or magnetic disk in an example embodiment. Such memory may be accessible or coupled to one or more ECs 120. In the embodiments described herein, the memory 138 may be flash memory or other types of computer readable medium accessible to the TCON 136. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 128 (a.k.a. a power supply unit (PSU)). The PMU 128 may manage the power provided to the components of the information handling system 100 such as the processor 102, a cooling system such as a bank of fans, one or more drive units 114, the EC 120, the display device 110, and other components that may require power when a power button has been actuated by a user. In an embodiment, the PMU 128 may be electrically coupled to the bus 108 to provide this power. The PMU 128 may regulate power from a power source such as a battery 130 or A/C power adapter 132. In an embodiment, the battery 130 may be charged via the A/C power adapter 132 and provide power the to the components of the information handling system 100 when A/C power from the A/C power adapter 132 is removed.

The information handling system 100 may include a Basic Input/Output System (BIOS) 128. The BIOS 128 may be any computer readable and executable code, hardware, or combination thereof that perform hardware initialization during a boot-up process and may provide runtime services for operating systems and programs. The BIOS, in some instances described herein, may be prevented from being loaded based on certain components of the information handling system 100 failing according to an analysis of the EC 120 per the processes and methods described herein.

The information handling system 100 may further include a peripheral controller hub (PCH) 118. The PCH 118 controls particular data paths and support functions used in conjunction with the processor 102, such as, for example, a system clock, a display interface (e.g., a video source such as an embedded display port (eDP)), and the like. In the context of the present specification, the PCH 118 may interact with the data paths associated with the TCON 136 and EC 120 in order to cause those instructions to be presented to the user at the display panel 146 of the display device 110.

As described, the information handling system 100 may also include guided diagnostic flow module 134 that may be operably connected to the bus 108. The guided diagnostic flow module 134 may access computer readable medium 122 that may contain space for data storage. The guided diagnostic flow module 134 may, according to embodiments of the present description, perform tasks related to initiating one or more types of diagnostic processes. Some of these diagnostic processes described herein may referred to as a "targeted guided diagnostic flow" and an "exhaustive guided diagnostic flow." In the embodiments, the guided diagnostic flow module 134, via execution of the EC 120, may determine that a power-on process has been initiated at the information handling system 100. This power-on process may have been initiated via a user pressing a power button on the information handling system 100. As a user actuates the power button to power on the information handling system 100, the EC 120 may power up and engage in one of the guided diagnostic flows used by the information handling system 100 to check various components (e.g., the processor 102, a battery 130, the BIOS 126, RAM (e.g., DIMM or M.2 device) within the information handling system 100.

The EC 120 may also, during operation, enter an enhanced sign of life (eSOL) process that checks for one of two triggering events to proceed to engage in the guided resolution processes described herein. This eSOL process may be part of an information handling system's 100 pre-boot sequence. In some embodiments described herein, the eSOL process may be defined by a set of code instructions that, when executed by a processing device such as the EC 120 or TCON 136, allows for the TCON 136 to display text, images, and/or line drawings on the LCD panel in instances where the CPU is not yet functional. The displaying of this text, images, and/or line drawings on the display device 110 allows for the user to know that power has been initiated at the information handling system as well as inform the user of a current state of the information handling system. Additionally, in the example embodiments described herein, the display of the text, images, and/or line drawings (per the execution of the code instructions defining the eSOL) notifies the user that a hardware component has issues that prevent the information handling system from booting as well as notifying the user if, when, and how the issue is to be resolved (e.g., via manual manipulation of the issue-experiencing hardware device by the user). If the eSOL process is successfully completed, a bootstrap loader (e.g., BIOS 126) is invoked to load an operating system. Where issues are discovered during this eSOL process that prevents booting of the operating system, the information handling system 100 in the present specification may initiate the any of the guided diagnostic flows described herein, for example the exhaustive guided diagnostic flow, the targeted guided diagnostic flow, or others described herein. Some of these issues detected by the EC 120 may include, for example, a missing, defective, or dead battery 130 with the A/C power adapter 132 attached to the information handling system 100, an issue associated with the processor 102 (e.g., overheating, not receiving enough power, fan not working or providing insufficient cooling, and the like), an issue associated with the hardware of the random access memory (RAM), an issue accessing RAM, an issue associated with read-only memory (ROM) (e.g., error when accessing ROM), a power supply issue (e.g., insufficient power being provided, unauthorized or incompatible power supply attached, or the like), an issue with bootable media not found, an issue associated with video output via the display device 110 (e.g., error when accessing video RAM, graphic processing unit (GPU) overheating, or the like), or an issue associated with the processor 102 (e.g., a bad processor 102 socket or defective processor 102), or another type of issue that prevents the computing device from booting up. In some embodiments, the EC 120 may interact with the processor 102 allowing the processor 102 to take over and also detect whether certain other devices within the information handling system 100 are preventing a proper booting of the BIOS or an operating system (OS). Specific examples may include a trusted platform module (TPM), a PCIe card, or even the BIOS itself that prevent such as booting. Because the processor 102 may be needed to access some of these devices, during the guided diagnostic flows described herein, the processor 102 may communicate through the EC 120 to the TCON 136 in order to present any additional messages describing how to rectify those issues associated with those devices only accessible by the processor 102. In each instance, however, the EC 120 may communicate directly to the TCON 136 in order to present the instructions to the user as described in various embodiments described herein.

A first of a plurality of triggering events detected by the EC 120 during the eSOL process may include the detection by the EC 120 that a hot key was actuated by a user which initiates the eSOL process as described herein. The hot key may be any key or series of keys (e.g., an actuation of the "G" key and power button) presented by the user at an input device 122 such as a keystroke on a keyboard, a volume button, a dedicated key specific to initiate the eSOL process by the EC 120 or the like. When the EC 120 detects the actuation of a hot key, the EC may execute an exhaustive guided diagnostic flow as described herein. In this embodiment, the EC 120 may read and save electrical current usage measured from an integrated circuit associated with the PMU 128. The EC 120 may then cause a series of power rails linking the EC 120 to a plurality of hardware devices of the information handlings system to be turned on sequentially (e.g., following a sequenced order used by the EC 120 during a normal power sequencing process during boot-up). Because the information handling system may include a plurality of power rails, each power rail may be addressed, one at a time, by the EC 120. As each of the power rails are turned on, the EC 120 may wait for a period of time for each power rail to be stabilized and the EC 120 may execute program code that causes the EC 120 to check if the hardware devices operatively coupled to each of the individual power rails are visible to the EC 120. The EC 120 may further determine whether the EC 120 can detect, from the PMU 128, whether an unexpectedly larger current increase (indicative of a short) or decrease (indicative of an overcurrent protection voltage regulator shutdown) is present. The exhaustive guided diagnostic flow may check all hardware devices operatively coupled to any power rail within the information handling system in order to determine if and which of the plurality of hardware devices are experiencing issues that prevent the information handling system from booting up. Where the devices are not discoverable by the EC 120 or if there was a detected current increase or decrease, the EC 120 may initiate what is called a guided intervention flow herein. In this embodiment, the exhaustive guided diagnostic flow is user-initiated via the user's actuation of the hot key and may, in an embodiment, be initiated prior to a complete boot-up of the BIOS 126 by the EC 120.

A second of the plural triggering events detected by the EC 120 during the eSOL process may be the determination by the EC 120, automatically, that a power sequencing timeout has occurred. In an embodiment, the power sequencing timeout may occur when the EC 120 has attempted to initiate the power sequencing of a plurality of power rails and one or more power rail indicates that an issue has occurred due to a hardware device coupled to that power rail not being detected, not being initialized, or otherwise not operating. In an embodiment, the EC 120 may disengage power to a last power-enabled power rail linking the PMU 128 to all devices coupled to that power rail. The EC 120 then reads and saves measured electrical current usage from an integrated circuit associated with the PMU 128 and waits for a period of time for the power rail to be stabilized. The EC 120 then executes program code that causes the EC 120 to check if the devices are visible to the EC at that last power-enabled power rail and determines whether the EC 120 can detect at the PMU 128 whether an unexpectedly larger current increase (indicative of a short) or decrease (indicative of a overcurrent protection voltage regulator shutdown). Where any device is not discoverable by the EC 120 or if there was a detected current increase or decrease, the EC 120 may initiate what is called a guided intervention flow herein. Unlike the exhaustive guided diagnostic flow that is user-initiated, this targeted guided diagnostic flow is automatically initiated, at boot-up, by the EC 120. In this targeted guided diagnostic flow, in contrast to the exhaustive guided diagnostic flow, the EC 120 may single out, automatically, a specific hardware device operatively coupled to a specific power rail that prevents or hung the boot up of the information handling system instead of checking every hardware device operatively coupled to every power rail as in the exhaustive guided diagnostic flow.

Either of the above triggering events, where issues are discovered by the EC 120, leads to the EC 120 providing, to a user, specific directions as to how to proceed in order to remedy the discovered issues. The guided intervention flow initiated during either of the targeted guided diagnostic flow or exhaustive guided diagnostic flow may cause the EC 120 to interact with the display device 110 and specifically the timing controller (TCON) 136. This interaction, as described herein, causes specific instructions to be presented to the user. In the context of the present specification, the instructions presented to the user at the display panel 146 of the display device 110 may include any text or images that provides visual instructions to the user descriptive of how the components of the information handling system 100 are to be physically manipulated by the user. As a consequence, the user may interact with the input devices 112 in order to notify the EC 120 when the components have been physically manipulated per the instructions provided in order to fix those issues detected by the EC 120. This allows the user to fix those issues that the user can before addressing whether the information handling system 100 should be sent back to the manufacturer or a third-party repairer for further assessment of the issues is needed.

The EC 120 may, during operations of the methods described herein, set a boot flag to notify the BIOS 126 to either execute a memory reference code and halt operations of the information handling system 100 (specifically conducting a boot-up process) or notify the BIOS 126 that the diagnostic boot flow is being conducted. Based on the type of guided diagnostic flow and the efficacy of the actions by the user per the instructions provided, the BIOS 126 may or may not be loaded. Where the BIOS is loaded, the user may be informed as to what issues arose and what can be done to permanently rectify those issues that may arise later. Where the BIOS cannot be loaded, the EC 120 may provide information at the display panel 146 of the display device 110 indicative of what the user may do to remedy the issues from order new hardware or returning the information handling system 100 to the manufacturer or to a third-party repairman. The presently described systems and methods, therefore, reduces the number of information handling systems 100 from being returned to the manufacturer where the user can easily remedy those issues detected.

In an embodiment, the guided diagnostic flow module 134 may communicate with the main memory 104, the processor 102, the display device 110, the alpha-numeric input device 112, and the network interface device 116 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
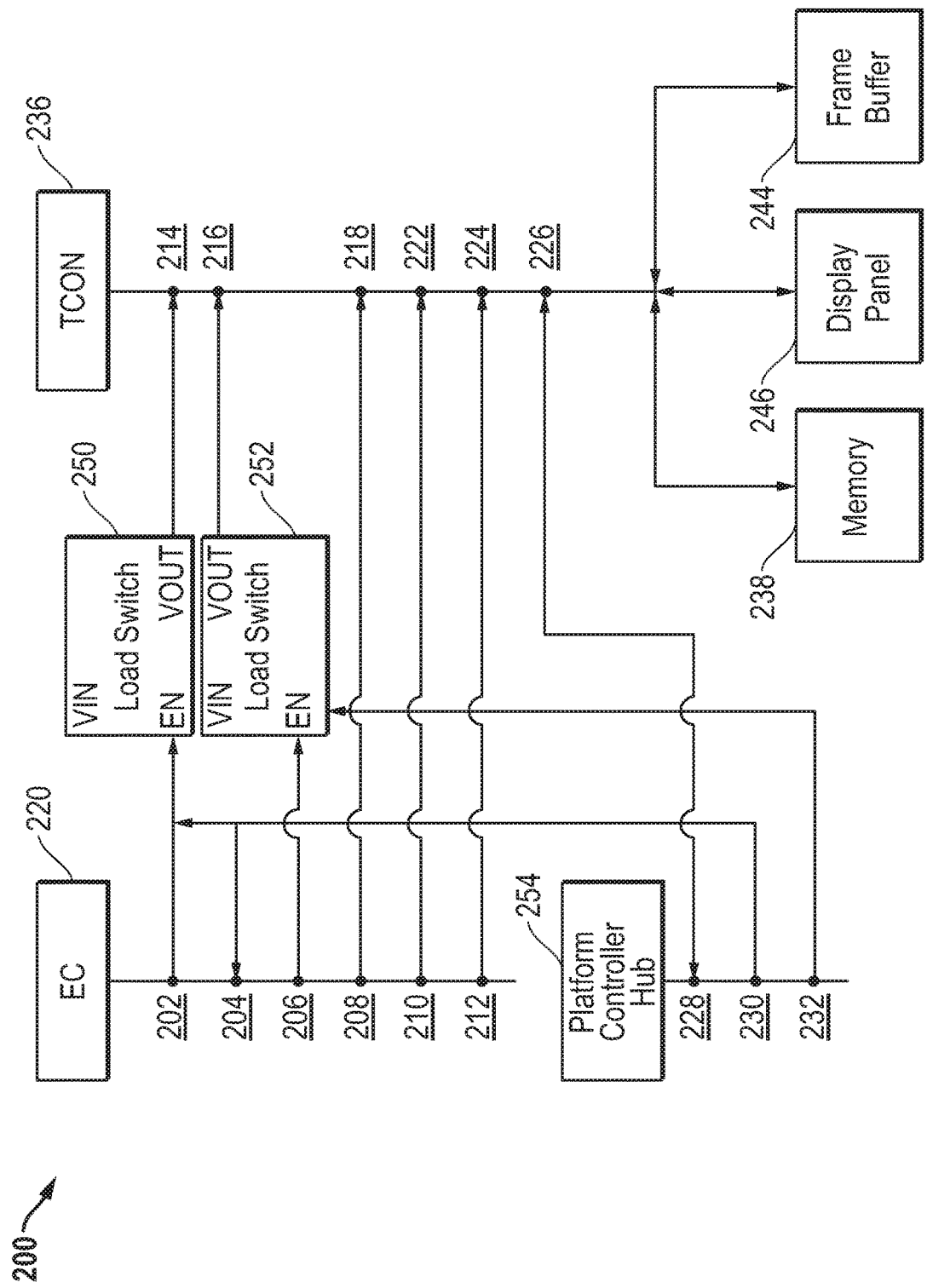
FIG. 2 is a graphic diagram illustrating pre-boot signals between components of the information handling system accord to an embodiment of the present disclosure.

FIG. 2 is a block diagram 200 illustrating pre-boot signals between components of the information handling system accord to an embodiment of the present disclosure. For illustration purposes, the interactions between the components assume that the display panel 246 may be any type of display including, for example, a liquid crystal display (LCD) panel. However, it should be understood that similar types of interactions between the components of the information handling system as those described herein may occur with other types of display panels, such as, for example, light emitting diode (LED) panels, organic LED (OLED) panels, and the like.

In FIG. 2, the EC 220 includes signaling connections 202, 204, 206, 208, 210, and 212. These signaling connections specifically includes an LCD_ENVDD 202 signaling connection that may be a voltage signal to enable power to the TCON 236 with this signal being used by the EC 220 to turn ON the TCON 236 before the PCH 254 is ready or unable to. The signaling connections may also include an PCH_ENVDD 204 signaling connection which is a voltage signal to enable power to the TCON from a PCH and is connected to the EC 220 to inform the EC 220 that the PCH 254 is ready to turn on the display panel 246 after, for example, a graphics driver has successfully been loaded by the EC 220. The signaling connection may further include an EN_INVPWR 206 signaling connection that enables the power to the display panel 246. The signaling connection may further include an eSOLC 208 signaling connection that is an enhanced sign-of-life control (eSOL) signal. The signaling connection may further include an eSOLC_CLK 210 signaling connection that is eSOL clock signal. The signaling connection may further include an eSOLC_DAT 212 signaling connection that is an eSOL data signal.

The TCON 236 includes signaling connections 214, 216, 218, 222, 224, and 226. The signaling connection may include, specifically, an LCDVDD 214 signaling connection that is a voltage for the TCON 236. The signaling connections may also include an INV_PWR_SRC 216 signaling connection that is a main power to the display panel 246 (e.g., LCD display panel). The signaling connections may further include an eSOLC 218 signaling connection that is an eSOL control signal. Still further, the signaling connections includes an eSOLC_CLK 222 signaling connection that is an eSOL clock signal. Even further, the signaling connections includes an eSOLC_DAT 224 sign of life data signal. The signaling connections may also include an eDP_HPD 226 signaling connection that is a signal from an embedded DisplayPort (eDP) asserting hot plug detect (HPD)), in an embodiment. The eSOL data signal is a signal associated with an enhanced sign of life process initiated by some information handling systems and described herein. The eSOL may be initiated by, for example, an EC during a boot up process. In some embodiments, the eSOL process may be initiated to notify, at least visually, to a user that power to the system has been provided after the user has actuated a power button or switch. In the context of the embodiments of the present specification, this eSOL may also be used to guide the user, via text, images, and graphics presented on a screen, to perform certain manual actions to one or more hardware devices within the information handling system. These hardware devices may be those devices identified via the execution of a targeted or exhaustive guided diagnostic flow.

The PCH 254 includes signaling connections 228, 230, and 232. The signaling connections may include, specifically, an eDP_HPD 228 signaling connection (e.g., a signal from the TCON 236 to the PCH 254 asserting presence of the display panel 246). The signaling connections may also include an PCH_ENVDD 230 signaling connection (e.g., a signal indicating that a graphics driver is loaded and ready to send display to the display panel 246). The signaling connections may further include an PCH_INV_PWM 232 signaling connection (e.g., a signal from the PCH 254 to enable the main power to the display panel 246). Although certain signaling connections are described herein, the present specification contemplates that any other signaling connection may be implemented based on the types of components used as well as the control that the EC 220 may exert on the TCON 236 and display panel 246. The PCH 250 may interact with the EC during certain diagnostic processes and steps described herein. In some instances, the processor of the information handling system may be placed in operation in order to gain access to certain hardware devices such as memory devices (e.g., DIMM). The EC may receive an instruction (e.g., a signal) from a video source (e.g., eDP of a PCH) of the information handling system that the video source is available. In response, the EC may send a message to the TCON instructing the TCON to display, on the display panel, an output of the video source (e.g., eDP of the PCH) that include the images, text, messages, and diagrams as described herein. The user may then review these images, text, messages, and diagrams in order to be guided to perform the guided manipulation of these hardware devices. As such, in certain embodiments described herein, the processor and PCH may interact with the EC and TCON as described in order to execute the guided diagnostic flows in relation to those devices that are only accessible upon activation of the processor and upon execution of the BIOS of the information handling system.

The connection between the EC 220 and the TCON 236 may further include intermediary circuitry that, in some embodiments, may include a number of load switches 250, 252. A first load switch 250, a second load switch 252, or other load switches may be used to connect or disconnect a load to a power source. The load switches 250, 252 may enable the EC 220 to disable and re-enable power to the components of the information handling system and devices subject to the guided diagnostic flows according to the embodiments of the present disclosure. In other embodiments other circuitry may be used to communicatively couple the EC 220 to the TCON 236 such as logic circuits among others and the present specification contemplates these other circuits.

As described herein, the TCON 236 is associated with a memory 238, a display panel 246, and a frame buffer 244. During operation of the frame buffer 244, the EC 220 may instruct the TCON 236 to copy (e.g., via direct memory access (DMA) for example), from the memory 138 (e.g., a flash memory 138) to the frame buffer 144, an image 143 that may contain any of a logo 144, an image, or any accompanying error messages 146-1 to 146-n that indicate an error or instruct a user how to manipulate one or more components of the information handling system. These error messages 146-1 to 146-n loaded onto the frame buffer 144 may be associated with an issue discovered by the EC 220 during one or more of the eSOL operations and the appropriately executed guided diagnostic flows (e.g., the targeted guided diagnostic flow or the exhaustive guided diagnostic flow). In order to present the error messages 146-1 to 146-n, logo 144, and other information presented to the user, the frame buffer 144 may create a composite bitmap of the image 143 that is to be presented on the display panel.

During pre-boot, the EC 108 may receive power from the PMU and activate the TCON 236 by enabling the LCD_ENVDD 202 signal connection. Upon completing, for example, a firmware loading process from the memory 238, the TCON 236 may notify the EC 220 that it is ready to receive commands by toggling an eSOLC 218 signaling connection to the eSOLC 208 signaling connection. The EC 220 may then send a command to the TCON 236 via the eSOLC_CLK 210 signaling connection to the eSOLC_CLK 222 signaling connection of the TCON 236 (e.g., a clock line). The EC 220 may provide eSOLC_DAT 212 signaling connection to eSOLC_DAT 224 sign of life data signal of the TCON 236 (e.g., data line). In this way, the EC 220 may cause the TCON 236 to display any of a plurality of error messages (e.g., 146-1 to 146-*n* in FIG. 1) when an issue was found. The messages provide information about the issue detected by the EC 220 as well as instructions for the user to physically manipulate any of a plurality of components of the information handling system. For example, as previously described, the EC 220 may instruct, using the signals eSOLC_CLK 210 signaling connection and eSOLC_DAT 212 signaling connection, the TCON 236 to assemble a splash screen (e.g., a logo, an image, and one or more error messages) in the frame buffer 244 and then instruct the TCON 236 to transfer the contents of the frame buffer 244 to the display panel of the display device using, for example, direct memory access (DMA). In an embodiment, the instructions sent by the EC 220 via signals 210 and 212 and received by the TCON 236 as 222, 224, respectively, may use the I$^2$C (or similar) protocol.

The EC 220 may provide a signal from the LCD_ENVDD 202 signaling connection (to enable the load switch 250), which provides power to the LCDVDD 214 signaling connection to turn on the TCON 236. The EC 220 may provide a signal from the EN_INVPWR 206 signaling connection (e.g., to enable the load switch 252) to the INV_PWR_SRC 216 signaling connection to power the display panel 246. The EC 220 may provide other signals specifically related to the type of display panel 246 such as a backlighting signal, brightness signal, or other type of signal that provides that the display panel 246 will provide output to the user. In this way, the EC 220 instructs the TCON 236 to power on various components associated with the display panel 246 before the PCH 254 is turned on. The EC 220 may, upon execution of code instructions, may further direct a power management unit (PMU) to initiate a power sequence process that, one at a time, powers on each of a plurality of power rails to detect which hardware devices may be preventing the boot up of the information handling system. When the EC 220 detects a specific device such as a DIMM or its associated connector is either not detectable or that an undercurrent or overcurrent is present, the EC 220 may direct power to be removed from the power rail associated with the DIMM and its connector. At this point, the EC 220 may provide the signal from the LCD_ENVDD 202 signaling connection which provides power to the LCDVDD 214 signaling connection to turn on the TCON 236. The TCON 236 may be provided with an error code or other identification data descriptive of the issue-experiencing hardware device (e.g., the DIMM in this example) from the EC 220. The TCON 236, once powered up may access the memory 238 and retrieve any data (e.g., text, messages, graphics, images) associated with the error code and cause that data to be displayed to the user using the frame buffer 244 and display panel of the display device.

In an embodiment, during a pre-boot process, the EC 220 may ready and address a PMU (e.g., PMU 128 of FIG. 1) to determine if the battery (e.g., battery 130 of FIG. 1) was removed before being placing back in the information handling system (e.g., indicating whether the EC 220 is to clear the battery register), what the current battery level is (e.g., indicating whether the EC 220 is to display a message asking the user to wait for the battery to be charged to a pre-determined level), whether a power adapter (e.g., A/C power adapter 132 of FIG. 1) is connected to a voltage input (e.g., indicating whether to display a message to connect the power adapter if the battery level is below a particular level), whether the power adapter satisfies the charging specifications of the battery or whether the power adapter is compliant with a standard promulgated by the manufacturer of the information handling system (e.g., indicating whether to display a message to connect a compliant power adapter), and the like. These processes may prepare the EC 220 and TCON 236 to perform the processes of the targeted guided diagnostic flow and/or exhaustive guided diagnostic flow as described herein.

Thus, during a pre-boot process, the EC 220 may instruct the TCON 236 to power-on various components (e.g., backlight, PWM controller, and the like) of the display panel 246. In addition, the EC 220 may instruct the TCON 236 to assemble the screen image in a frame buffer 244 and display the assembled image (e.g., BMP) on the display panel per the outcomes of the targeted guided diagnostic flow and/or exhaustive guided diagnostic flow as described herein.

In an embodiment, if no issues were found by the EC 220 during the pre-boot process and after execution of either the targeted guided diagnostic flow or exhaustive guided diagnostic flow as described herein, then the EC 220 causes the BIOS (e.g., BIOS 126 of FIG. 1) to boot. In response, the EC 220 releases control of enabling the load switch 250 to the PCH 254. From this point forward, the TCON 236 is controlled by the PCH 254. The EC 220 may also instruct the TCON 236 to switch from displaying any contents presented at the frame buffer 244 to displaying the output (e.g., eDP or similar) of the PCH 254 via eSOLC_CLK 210 signaling connection and SOLC_DAT 212. The EC 220 may also instruct the PCH 254 to enable the main power to the display panel 246 via load switch 252. Thus, the EC 220 may instruct the TCON 236 to switch during a BIOS boot, after the PCH 254 signals that the PCH 254 is ready (e.g., the video driver has been loaded and the like).

Thus, after the BIOS has booted (or during the BIOS boot), when the PCH 254 is ready, the PCH 254 may signal to the EC 220 that the PCH 254 is ready to provide a video signal (e.g., eDP). In response to the signal from the PCH 254, the EC 220 may signal (e.g., by sending command to the TCON 236 via eSOLC_CLK 210 signaling connection and eSOLC_DAT 212 signaling connection) to the TCON 236 to switch from displaying the contents of the frame buffer 244 to displaying the output of the PCH 254.

In the embodiments where the EC 220 does detect issues with any of the components of the information handling system, however, the EC 220 does not allow the BIOS to boot until the processes associated with the targeted guided diagnostic flow and/or exhaustive guided diagnostic flow are completed. These processes are described in more detail in FIGS. 3-7.

Figure 3:
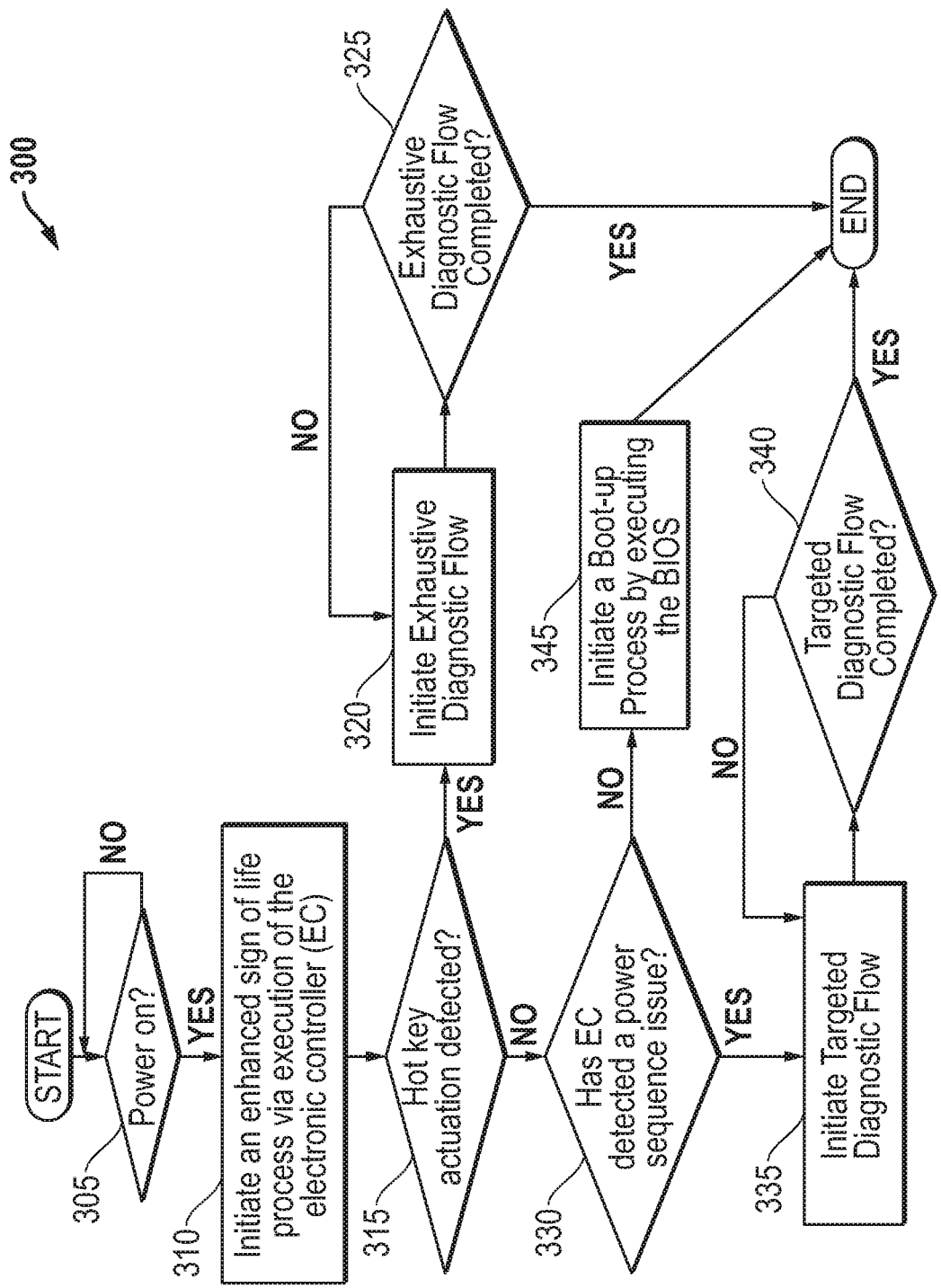
FIG. 3 is a flow diagram of a method of executing a guided diagnostic flow according to an embodiment of the present disclosure.

FIG. 3 is a flow diagram of a method 300 of executing a guided diagnostic flow according to an embodiment of the present disclosure. As described herein, the eSOL process may be initiated upon the actuation of a power on switch by a user. The power switch may be formed into a chassis of the information handling system such that a user may access it to initiate, for example, a boot-up process. In the presently described embodiments, the actuation causes the EC to detect whether power is on at block 305, and initiate an enhanced sign of life (eSOL) process via execution of the EC at block 310. As described herein, the eSOL process may be part of an information handling system's pre-boot sequence. In some embodiments described herein, the eSOL process may be defined by a set of code instructions that, when executed by a processing device such as the EC and TCON, allows for the TCON to display text, images, and/or line drawings on the LCD panel during the execution of the guided diagnostic flow. The displaying of this text, images, and/or line drawings on the display device allows for the user to know that power has been initiated at the information handling system as well as inform the user of a current state of the information handling system. Additionally, in the example embodiments described herein, the display of the text, images, and/or line drawings (per the execution of the code instructions defining the eSOL) notifies the user that a hardware component has issues that prevent the information handling system from booting as well as notifying the user if, when, and how the issue is to be resolved (e.g., via manual manipulation of the issue-experiencing hardware device by the user).

This causes the EC to determine, at block 315, whether the EC has detected the actuation of a hot key. In a specific embodiment, the EC may monitor for a specific key being actuated as the hot key such as an "ESC" (e.g., escape) key or a "Enter" key found on a keyboard associated with the information handling system. Other keys may be used and the present specification contemplates the use of such other keys to be used as the hot key as described herein. In an embodiment, the EC may receive a hot key indication via any type of driver activated by the EC such as a keyboard driver or other driver associated with an input device.

If the hot key is detected (YES determination) at block 315, the processes described herein may continue with initiating an exhaustive guided diagnostic flow at block 320. The exhaustive guided diagnostic flow may be completed using different processes than that described in connection of a targeted guided diagnostic flow described here in blocks 330 and 335. In a specific embodiment described herein, the EC of the information handling system may execute computer code to initiate a power sequence process. In this embodiment, the information handling system may include a plurality of power rails, each power rail may be addressed, one at a time, by the EC. As each of the power rails are turned on, the EC may wait for a period of time for each power rail to be stabilized and the EC may execute program code that causes the EC to check if the hardware devices operatively coupled to each of the individual power rails are visible to the EC. For example, a power rail may be operatively coupled to a DIMM within the information handling system. The EC may further execute program code to detect whether it can access the DIMM or not. The EC may further, upon execution of program code, determine whether the EC can detect, from the PMU, whether an unexpectedly larger current increase (indicative of a short) or decrease (indicative of an overcurrent protection voltage regulator shutdown) is present. In the example, where the DIMM is coupled to a given power rail, the EC can detect, from the PMU, whether an unexpectedly larger current increase or decrease is present on that rail associated with the DIMM. It is contemplated that this exhaustive guided diagnostic flow may be conducted for each of the hardware devices operatively coupled to each of the power rails within the information handling system. Therefore, compared to a targeted guided diagnostic flow, the exhaustive guided diagnostic flow may check all hardware devices operatively coupled to any power rail within the information handling system in order to determine if and which of the plurality of hardware devices are experiencing issues that prevent the information handling system from booting up. Further, compared with a targeted guided diagnostic flow in an example embodiment, the exhaustive guided diagnostic flow is initiated by a user actuating a hot key such as when there are boot up issues as well as when an information handling system fails to boot. In the embodiments described herein, both the targeted guided diagnostic flow and exhaustive guided diagnostic flow provide instructions to a user of the information handling system via a display device in order to resolve any issues detected by the EC of the information handling system.

As will be described herein in other figures, the exhaustive guided diagnostic flow may include multiple processes that include interactions with the user. These interactions from the user with the information handling system may include multiple assessments by the EC that a plurality of components within the information handling system have issues or not. Additionally, the user may be instructed, via the EC, TCON, and display device, to conduct certain manipulations of components of the information handling system that may, itself, include multiple steps. At block 325, the method 300 may continue with determining whether the exhaustive guided diagnostic flow is completed. Where it is determined at block 325 that the exhaustive guided diagnostic flow is not completed, the method 300 may continue with executing any remaining processes associated with the exhaustive guided diagnostic flow at block 320. Where it is determined at block 325 that the exhaustive guided diagnostic flow is completed, the method 300 may end.

Where the hot key actuation from a user is not detected by the EC at block 315, the method 300 may continue, at block 330, with determining whether the EC has detected a power sequence issue during the pre-boot processes described herein. When the information handling system is powered on or rebooted, the power management unit and logic circuitry may follow a power sequence to supply operating voltages to the components of the information handling system in a particular order. In an embodiment, the power sequence may start with the standby power rails, which supplies power to EC. After the EC has received power, the EC may monitor any other power rails to determine, at block 330, whether the EC has detected a power sequence issue such as a short or overcurrent at these power rails. Where no power sequencing issues were detected by the EC at block 330, the method may continue to block 345 with the EC of the information handling system initiating a boot-up process by bootstrapping a BIOS of the information handling system.

Where the EC has detected a power sequence issue at block 330, the method 300 continues at block 335 with initiating a targeted guided diagnostic flow. As described herein, the targeted guided diagnostic flow may have different processes from that of the exhaustive guided diagnostic flow. As mentioned, unlike the exhaustive guided diagnostic flow, the targeted guided diagnostic flow may be automatically initiated in some embodiments by the EC and may focus on those power rails where either a hardware device has not been detected or an overcharge or undercharge current has been detected by the EC and PMU. Specific details related to the operation of the targeted guided diagnostic flow are described, at least, in connection with FIG. 5. However, both the targeted guided diagnostic flow and exhaustive guided diagnostic flow provide instructions to a user of the information handling system via a display device in order to resolve any issues detected by the EC of the information handling system.

As will be described herein, the targeted guided diagnostic flow may include multiple processes that include interactions with the user. These interactions from the user with the information handling system may include multiple assessments by the EC that a plurality of components within the information handling system have issues or not. Additionally, the user may be instructed, via the operation of the EC, eSOL, TCON, and display device, to conduct certain manipulations of components of the information handling system that may, itself, include multiple steps. The method 300 may continue at block 340 with determining whether the targeted guided diagnostic flow is completed. Where it is determined at block 340 that the targeted guided diagnostic flow is not completed, the method 300 may continue with executing any remaining processes associated with the targeted guided diagnostic flow at block 335. Where it is determined at block 340 that the targeted guided diagnostic flow is completed, the method 300 may end.

Figure 4:
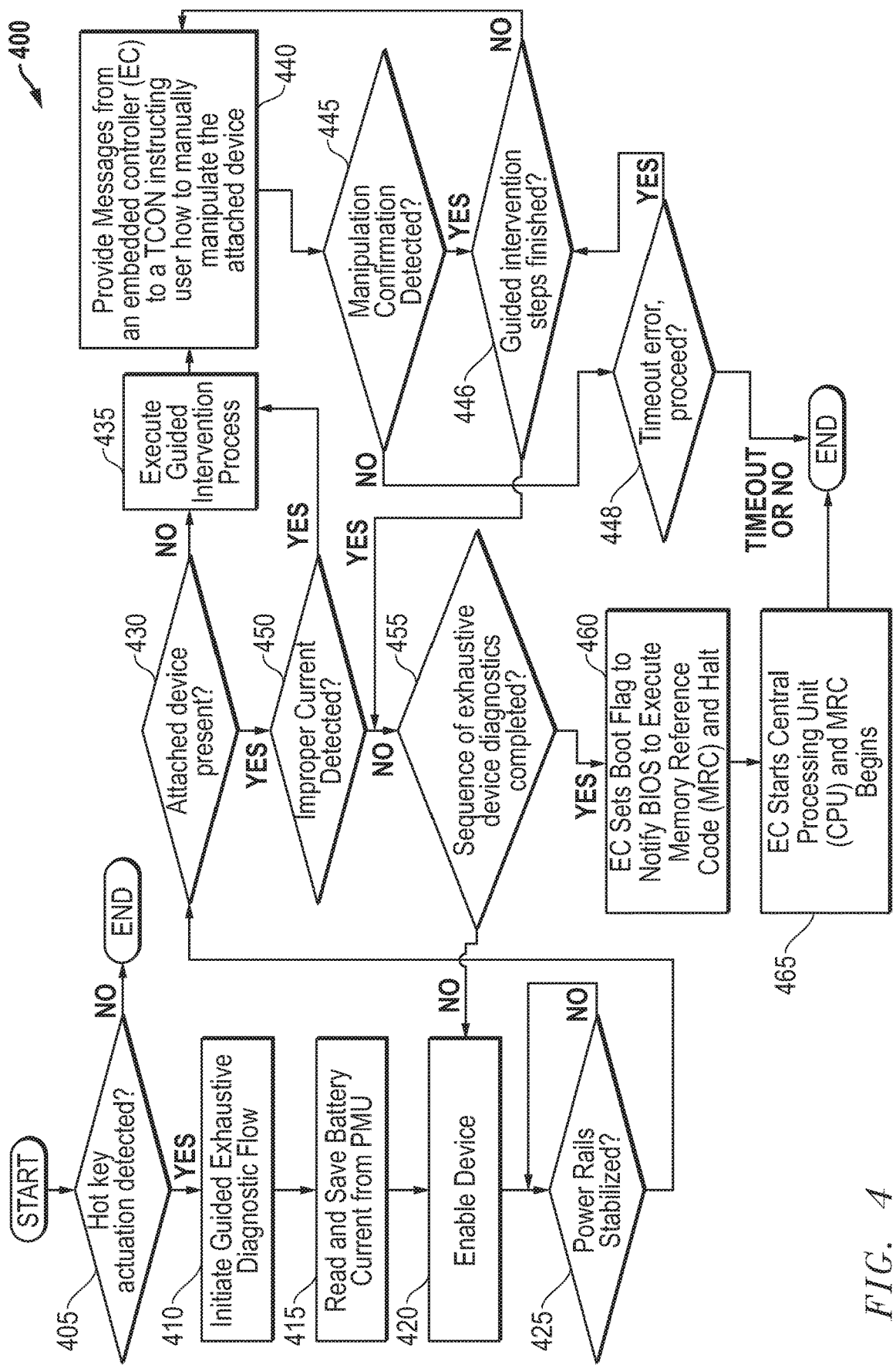
FIG. 4 is a flow diagram of a method of executing an exhaustive guided diagnostic flow according to an embodiment of the present disclosure.

Specific details relative to the processes associated with the exhaustive guided diagnostic flow and targeted guided diagnostic flow are described in more detail in connection with FIGS. 4 and 5, respectively. FIG. 4 is a flow diagram of a method 400 of executing an exhaustive guided diagnostic flow according to an embodiment of the present disclosure. The method 400 may begin at block 405 where the EC determines whether a hot key has been actuated by a user. Where the EC does not detect such an actuation (NO determination) at block 405, in an embodiment, the method 400 may end. In an alternative embodiment, the method 400 may continue with determining whether the EC has detected a power sequence issue during the pre-boot processes such as that described herein at block 330 of FIG. 3, for example.

Where the EC does detect such an actuation of the hot key (YES determination) at block 405, the method 400 may initiate the exhaustive guided diagnostic flow at block 410. The exhaustive guided diagnostic flow initiated at block 410 may include a plurality of processes. These processes include, at block 415, the EC reading and saving battery current data from the PMU. The battery current data obtained at block 415 may be used as a baseline measurement used in other processes associated with the exhaustive guided diagnostic flow. In these other processes a detected current at any given power rail may be compared to this baseline current measurement to assess whether a no current, an over-current, or an under-current state exists at a device, component, or power rail.

The method 400, at block 420, may continue with enabling a specific device to be detected by the EC. In these embodiments, the power rails may have initially provided power in order to power each of several individual components of the information handling system. In an embodiment, a current at these plural power rails may be read and saved at block 415 and each power rail may be turned on at block 420 to enable a device. The sequence of which power rail is turned on and which device is enabled may be based on a power sequence initiated during a regular booting process. Example devices, that may be operatively coupled to any of the plural power rails within the information handling system may include processors such as the CPU, GPU or other processing resources, memory devices such as a DIMM, a M.2 standard-based cards such as a PCIE card, a serial AT attachment (SATA) device, a non-volatile memory express (NVME) drive, or any cables or connectors associated with these devices. This list of devices is not meant to be limiting and the present specification contemplates that other types of devices used within an information handling system may be included. It is further appreciated that any of these devices may be identified by any of the guided diagnostic flows described herein as being issue-experiencing devices to which the user is guided to address as described herein. Therefore, at block 420, the EC may attempt to enable a PCIe card so that the EC can detect that PCIe card at block 420.

The method 400 may continue with determining whether the power rail to the device is stabilized at block 425. Stabilization occurs after a period of time as the current is allowed to fall to a constant current. The current at any given power rail may be measured using, in an embodiment, a current sensor operatively coupled to the PMU of the information handling system. At block 425, the EC may direct the current sensor of the PMU, in this embodiment, to measure the current and determine when the value has stabilized. The PMU may then indicate that the current at the rail has stabilized and the EC may continue on with the method 400. If stabilization has not occurred (NO determination) at block 425 then the EC may continue to wait until, in an embodiment, the PMU so indicates that the current is stabilized.

When the stabilization has occurred (YES determination) at block 425 as measured by the current sensor of the PMU, the method 400 may continue with determining where an attached device is present at block 430. This may be done by determining, via the EC, that each component operative coupled to the power rail is powered on and can be accessed or addressed by the EC. Where it is determined that an attached device is not present at block 430 where one should be, this indicates in one example embodiment that an issue has occurred that prevents the information handling system from booting up. For example, the EC may have been provided data indicative that a PCIe card that helps to facilitate the transmission of data throughout the information handling system by, for example, creating multiple end-points out of one endpoint to allow multiple devices share the PCIe card. The PCIe card is expected to be operatively coupled to the EC via the power rail. However, where data signals cannot be transmitted to or from the PCIe card, the EC cannot detect the presence of the PCIe card at block 430.

In some embodiments, the method 400 may include detecting improper currents at block 450 after the EC has determined that the device is present (YES determination) at block 430. In this embodiment, the EC may detect whether an unexpectedly larger current increase is present at the power rail associated with the device, indicative of a short, or decrease of that current that is indicative of an overcurrent protection voltage regulator shutdown. Where an improper current is detected (YES determination) at block 450, the method 400 may continue with the execution of the guided intervention at block 435 as described herein.

At this point, the method 400 may continue by engaging a user via the execution of a guided intervention process at block 435. This guided intervention may include, at block 440 the EC providing a message to the TCON that guides and instructs the user how to manually manipulate the device that, although physically attached to the information handling system, is detected by the EC to not be present or electrically coupled. In the example described in connection with FIG. 4, the message provided to the TCON by the EC may indicate an error code that informs the TCON that the PCIe card is not present or electrically coupled to the EC.

As described herein, the EC, upon detecting that the device is not present (NO determination) at block 430, may generate an internal error code that is to be received by the TCON present on a display device. The TCON, in an embodiment, may cross-reference this error code at a table in a memory of the display device and retrieve data associated with that error code. This data defines, in an embodiment, an image to be presented to the user at the display device via the frame buffer as described herein. In an embodiment, the data defines a single image that includes a plurality of types of instructions a user may follow to fix the issue detected by the EC. In these embodiments, the image may include text describing what the user should do to manipulate certain hardware within the information handling system in order to fix this issue. Additionally, or alternatively, the image may include visual aids that also inform the user as to how to manipulate certain hardware within the information handling system in order to fix this issue. Additionally, or alternatively, the image may include a logo that matches a logo on the hardware the user is to manipulate so that the user may visually identify the hardware during this guided intervention process at blocks 435 and 440. In the context of the PCIe card experiencing an issue, the images, messages, text, visual aids, and logos may describe a physical location of the PCIe card within the information handling system. Additionally, the images, messages, text, visual aids, and logos may describe how to access the PCIe card within the information handling system. This may include step by step instructions on how to disassemble the information handling system and remove portions of, for example a chassis or cover of the information handling system in order to gain access to the location within the information handling system where the PCIe card is located. Any other visual aids may also be presented to the user and the present specification contemplates that any information may be presented at the frame buffer in order to provide output to the user, visually, on the display panel of the display device.

In one embodiment, the EC may automatically remove power from the power rail powering the hardware device (e.g., the PCIe card), so that the user is not injured via electric shock or so damage to hardware device does not occur during this guided manipulation of the PCIe card. Thus, if a guided intervention involves moving, removing, or replacing a module like, for example, a DIMM, a M.2 card, PCIE card, SATA device, NVME drive, or cable, the EC may remove power to the module slot or cable connector to prevent device damage as well as injury to the user. When the power is turned off on the power rail, the user may be directed, at block 440, as to how to manually manipulate the hardware of the device as instructed.

The EC, at block 445, monitors for an indication from the user that a guided manipulation has been completed and will not proceed at block 445 until such confirmation is received from the user that at least one step is completed by the user. In an embodiment, the user may accomplish this indication by actuation a specific key at, for example, a keyboard of the information handling system. In an embodiment, at block 448 where the indication at block 445 is not received and a time out error has occurred or where the EC request confirmation to proceed and receives and indication it should not proceed, the method 400 may end here. A time out indication may occur at block 448 where no input is received at block 445 indicative of a user confirming manipulation of the hardware device. The decision to proceed or not at block 448, in one embodiment, may be dependent on a follow up request to proceed to a user. If an indication to proceed is received and indicates a manipulation completed, the flow may proceed to block 446 to determine whether the guided intervention steps have been completed in some embodiments. Where there is no timeout error and where the guided intervention step for a manipulation is confirmed as completed (YES Determination) at block 446, the method 400 may go to block 446 to determine if all guided intervention steps had been completed.

Where the confirmation that the manipulation of the hardware per the instructions presented to the user is completed (YES determination) at block 445, the EC may continue with the method 400 by determining, at block 446, if all guided intervention steps had been completed. As described herein, the guided intervention process may include a plurality of steps for the user to follow in order to access and manipulate the hardware device such as the PCIe card in this example. These steps may include instructions regarding how to first gain access to the PCIe card. For example, certain steps may need to be followed by the user to remove a cover to access inside the chassis of the information handling system, remove a number of screws, actuate a number of latches and the like in order to gain physical access to the PCIe card. Each of these steps may be presented to the user, one at a time, at block 440 when the EC has determined that not all of the steps of the guided intervention process have been completed at block 446. After each iteration of presenting instructs to the user as to how to manually manipulate the attached device (e.g., the PCIe card for example), the user may provide a confirmation of completion at block 445 and the EC may determine if all steps are completed or not at block 446.

Where the manipulation by the user is confirmed at block 445 and where the EC has determined that all guided intervention steps have been completed at block 446, the method 400 may continue to block 455 and determine whether the sequence is completed. Because the information handling system may include a plurality of power rails, each power rail may be addressed, one at a time, by the EC in a specific sequence in order to determine which of all of the hardware devices operatively coupled to each of the power rails may be experiencing issues that prevent the information handling system from booting up. The guided exhaustive diagnostic flow described in FIG. 4, therefore, may be executed to automatically check every hardware device operatively coupled to every power rail. In this embodiment, the sequence is completed when all devices operatively coupled to each of the power rails have been checked by the EC and all issues are resolved. The guided exhaustive diagnostic flow described in FIG. 4 may be conducted automatically before boot up as the user actuates a power switch or button on the information handling system. Some of these issues detected by the EC during the guided exhaustive diagnostic flow may include, for example, a missing, defective, or dead battery with the A/C power adapter attached to the information handling system, an issue associated with the processor (e.g., overheating, not receiving enough power, fan not working or providing insufficient cooling, and the like), an issue associated with the hardware of the random access memory (RAM), an issue accessing RAM, an issue associated with read-only memory (ROM) (e.g., error when accessing ROM), a power supply issue (e.g., insufficient power being provided, unauthorized or incompatible power supply attached, or the like), an issue with bootable media not found, an issue associated with video output via the display device (e.g., error when accessing video RAM, graphic processing unit (GPU) overheating, or the like), and issue associated with the processor (e.g., a bad processor socket or defective processor), or another type of issue that prevents the computing device from booting up. In some embodiments, the EC may interact with the processor allowing the processor to take over and also detect whether certain other devices within the information handling system are preventing a proper booting of the BIOS or an operating system (OS). Specific examples may include a trusted platform module (TPM), a PCIe card, or even the BIOS itself that prevents booting. Because the processor may only access these devices, during the guided diagnostic flows described herein, the processor may communicate through the EC to the TCON in order to present any additional messages describing how to rectify those issues associated with those devices only accessible by the processor. In each instance, however, the EC communicates directly to the TCON in order to present the instructions to the user as described herein.

Where the sequence is not completed (NO determination) at block 455, the method 400 may return to block 420 with enabling a second device within the power sequence and determining again whether the device is detectable by the EC at block 430. As such, the EC may methodically check each hardware device accessible to the EC for issues that may prevent booting of the information handling system, directing the user to physically manipulate the hardware associated with devices detected as causing issues by the EC, and confirming that the issue has been resolved as described in connection with blocks 430, 435, 440, 445, and 446.

Where an improper current is not detected (NO determination) at block 450, the method 400 may continue with again determining, at block 455, whether the sequence is completed. Again, the sequence is completed when all devices have been checked by the EC and all issues are resolved via execution of the guided intervention process by the EC at blocks 430, 435, 440, 445, and 446. Where the sequence is completed (YES determination) at block 455, the EC may set a boot flag to notify the BIOS to execute a memory reference code and halt at block 460. A boot flag may include a value in a non-extended partition record that indicates to a boot loader which partition to boot. The memory reference code may be part of the firmware of a motherboard that determines how the memory (e.g., RAM) of the information handling system will be read and written. As described herein, because the processor may only access certain devices such as memory devices during the guided exhaustive diagnostic flow, the processor may communication through the EC to the TCON in order to present any additional messages describing how to rectify those issues associated with those devices only accessible by the processor after execution of the BIOS. For example, where the information handling system includes a DIMM, the EC may direct the BIOS to be executed by the processor in order for the DIMM to be made accessible and subjected to the exhaustive diagnostic flow. In each instance of checking these processor-only accessible hardware devices, however, the EC may communicate directly to the TCON in order to present the instructions to the user as described herein. As such, the method 400 may continue at block 465 with the EC starting the processor and initiating a memory reference code flow described herein and specifically in connection with FIG. 6 in order to check those processor-only accessible hardware devices. At this point, the method 400 may end.

The method 400 allows for the EC to guide the user through a series of guided steps that are used by the EC to accurately identify those components that may be failing or, at least, preventing the information handling system from properly conducting a boot up process. The method 400 allows the EC to display text or images on the display device so long as the EC and display device are functional. The EC can interactively display messages that guide the user through diagnostic steps as well as display line drawings to clarify the instructions presented. If diagnosing the problem requires disassembling the information handling system, the information handling system can display a single disassembly step at a time and wait for the user to actuate a key or button before presenting another disassembly or hardware manipulation step at the display device. If a diagnosis involves moving, removing, or replacing a module like, for example, a DIMM, M.2 card, PCIE card, SATA device, NVME drive, or cable, the EC may remove power to the module slot or cable connector to prevent device damage as well as injury to the user. After removing power, the EC may present instructions to the user to actuate a key or button after the module has been successfully moved, removed, or replaced.

Because the EC provides error codes to the TCON, the memory storing the messages may be specifically tailored to the hardware and firmware present on the information handling system. Any additions to the hardware or changes to the devices within the information handling system may cause the data maintained on the table within the memory to be updated so that when the EC detects an issue with any new or altered device or hardware, new and information handling system-tailored messages may be presented to the user. In some embodiments, the memory accessible by the TCON and used as a data source for the messages presented to the user may be preloaded prior to the information handling system being received by the user.

In some embodiments, the diagnostic processes may not be completed physically by the user. In these embodiments, as the EC performs the series of diagnostics and has instructed the user to perform certain manipulations of the devices within the information handling system, the EC may conclude that, for example, the issue has arisen due to a defective device that is soldered onto a PCB within the information handling system. Because the user may not be as adept to fix such an issue, the EC may maintain an error code related to that defective part for review by a technician. This may allow for better diagnostic that presents a code that a short to, for example, the CPU is bad thereby limiting the amount of circuitry and hardware to be tested by the repairman when the manipulation cannot otherwise be done manually by the user. This reduces the amount of downtime at the information handling system and costs associated with repairing the devices within the information handling system.

Figure 5:
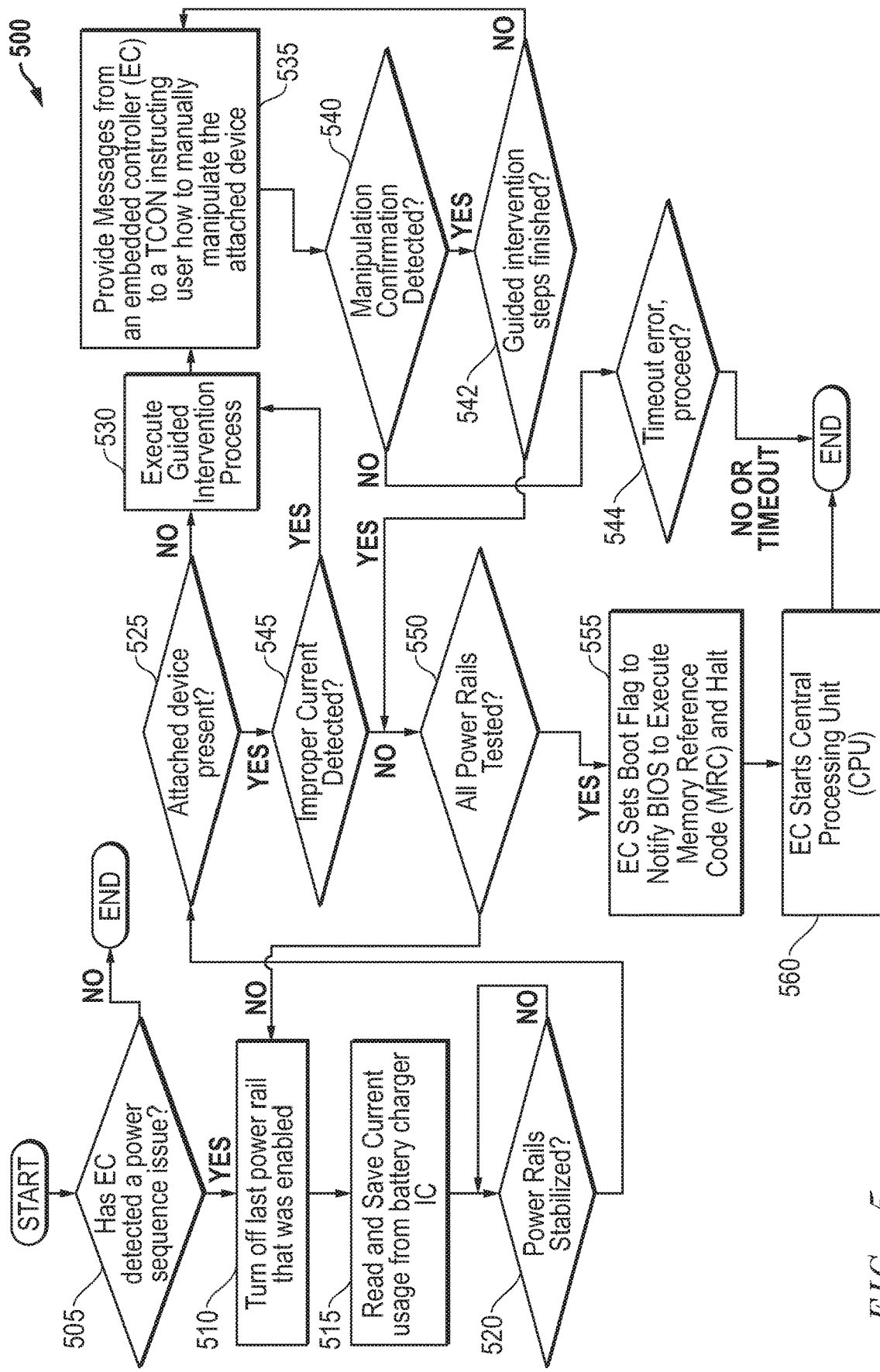
FIG. 5 is a flow diagram of a method of executing a targeted guided diagnostic flow according to an embodiment of the present disclosure.

FIG. 5 is a flow diagram of a method 500 of executing a targeted guided diagnostic flow according to an embodiment of the present disclosure. As described herein, in an embodiment, the method 500 may be executed after the EC has determined that a hot key has not been actuated during boot up initiation by a user similar to the process described in connection with FIG. 3. In other embodiments, no hot key needs to be activated but a bootup process may detect a power issue in the sequences of devices booting up. In the embodiment described in FIG. 5, the targeted guided diagnostic flow begins by determining, at block 505, whether the EC has detected a power sequence issue. When the information handling system is powered on or rebooted, the power management unit and logic circuitry may follow a power sequence to supply operating voltages to the components of the information handling system in a particular order. This power sequence is managed and monitored by the EC. In an embodiment, the power sequence may start with the standby power rails, which supplies power to the EC. After the EC has received power, the EC may monitor any other power rails via the PMU to determine, at block 505, whether the EC has detected a power sequence issue such as a short or overcurrent at these power rails. Where no power sequencing issues were detected by the EC at block 505, the method 500 may end. Boot up processes, in this embodiment, may continue as normal.

Where the EC has detected a power sequence issue at block 505, the method 500 continues at block 510 with the EC turning on a last power rail that was enabled and detected as having a power issue. As described herein, providing power to any given power rail may be part of a power sequencing process during a normal boot-up. Addressing the last power rail that enabled and detected as having a power issue, the EC may cause the PMU (or battery management unit (BMU)) to read and save the current usage from, for example, a charger integrated circuit (IC) at block 515. Again, this read and saved current usage may be used as a comparison current level to be compared to later in the method 500.

The method 500 may include determining whether the power rail to the device is stabilized at block 520. Stabilization occurs after a period of time as the current is allowed to fall to a constant current. If stabilization has not occurred (NO determination) at block 520 then the EC may continue to wait or monitor until a current stabilization is reached.

When the stabilization has occurred (YES determination) at block 520, the method 500 continues with determining where an attached device is present at block 525. This may be done by determining, via the EC, that each component operatively coupled to the power rail that is powered on can be accessed or addressed by the EC. Where it is determined that an attached device is not present at block 525, this indicates that an issue has occurred that prevents the information handling system from booting up. For example, if a test access request by the EC is not responded to by the attached device, this may indicate an issue with that device. Again, the issue-experiencing hardware device may be any type of hardware device within the information handling system. Example devices, that may be operatively coupled to any of the plural power rails within the information handling system may include processing devices such as CPU, GPU, or other processing resources, memory devices such as a DIMM, a M.2 standard-based cards such as a PCIE card, a serial AT attachment (SATA) device, a non-volatile memory express (NVME) drive, or any cables or connectors associated with these devices. This list of devices is not meant to be limiting and the present specification contemplates that other types of devices used within an information handling system may be included. It is further appreciated that any of these devices may be identified by any of the guided diagnostic flows described herein as being issue-experiencing devices to which the user is guided to address as described herein. Therefore, at block 525, the EC may attempt to access, for example, a SATA device as a particular example embodiment described herein in connection with FIG. 5.

In some embodiments, the method 500 may include detecting improper currents at block 545 after the EC has determined that the device is present (YES determination) at block 525. In this embodiment, the EC may detect whether an unexpectedly larger current increase is present at the power rail associated with the device, indicative of a short, or decrease of that current that is indicative of an overcurrent protection voltage regulator shutdown. Where an improper current is detected (YES determination) at block 545, the method 500 may continue with the execution of the guided intervention at block 530 as described herein.

If an attached device is missing at block 525, the method 500 may proceed to block 530 with the EC executing a guided intervention process. This guided intervention may include, at block 535, with the EC providing a message to the TCON that guides and instructs the user how to manually manipulate the device that, although physically attached to the information handling system, is detected by the EC to not be present or electrically coupled. In the example described in connection with FIG. 5, the message provided to the TCON by the EC may indicate an error code that informs the TCON that the SATA device is not present or electrically coupled to the EC. As described herein, the EC, upon detecting that the device is not present (NO determination) at block 525, may generate an internal error code that is to be received by the TCON present on a display device. The TCON, in an embodiment, may cross-reference this error code at a table in a memory of the display device and retrieve data associated with that error code. This data defines, in an embodiment, an image to be presented to the user at the display device via the frame buffer as described herein. In an embodiment, the data defines a single image that includes a plurality of types of instructions a user may follow to fix the issue detected by the EC. In these embodiments, the image may include text describing what the user should do to manipulate certain hardware within the information handling system in order to fix this issue. Additionally, or alternatively, the image may include visual aids that also inform the user as to how to manipulate certain hardware within the information handling system in order to fix this issue. Additionally, or alternatively, the image may include a logo that matches a logo on the hardware the user is to manipulate so that the user may visually identify the hardware during this guided manual manipulation process at block 535. In the context of the SATA device experiencing an issue, the images, messages, text, visual aids, and logos may describe a physical location of the SATA device within the information handling system. Additionally, the images, messages, text, visual aids, and logos may describe how to access the SATA device within the information handling system. This may include step by step instructions on how to disassemble the information handling system and remove portions of, for example a chassis or cover of the information handling system in order to gain access to the location within the information handling system where the SATA device is located. Any other visual aids may also be presented to the user and the present specification contemplates that any information may be presented at the frame buffer in order to provide output to the user, visually, on the display panel of the display device.

In one embodiment, the EC may automatically remove power from the power rail powering the hardware device (e.g., SATA device) so that the user is not injured via electric shock or so damage to hardware device does not occur during this guided manipulation of the hardware device. Thus, if a guided intervention involves moving, removing, or replacing a module like, for example, a DIMM, a M.2 card, PCIE card, SATA device, NVME drive, or cable, the EC may remove power to the module slot or cable connector to prevent device damage as well as injury to the user. When the power is turned off on the power rail, the user may be directed, at block 535, as to how to manually manipulate the hardware of the device as instructed and indicate that the manual manipulation is complete by actuating a key or button. The EC, at block 540, is therefore monitoring for an indication from the user and will not proceed (NO determination) at block 540 until such confirmation is received from the user that at least one step is completed by the user. In an embodiment, the user may accomplish this indication by actuation a specific key at, for example, a keyboard of the information handling system. In an embodiment, at block 544 where the indication at block 540 is not received and a time out error has occurred such as where no further response has been received at the EC or when a secondary inquiry indicates not to proceed at 544 the method 400 may end here. A time out indication may occur at block 544 where no input is received at block 540 indicative of a user confirming manipulation of the hardware device. The decision to proceed or not at block 544, in one embodiment, may be dependent on whether the guided intervention steps have been completed at block 542. Where there is no timeout error or where the guided intervention step is completed (YES Determination) at block 5440 the method 500 may go to block 542 to determine if all guided intervention steps had been completed.

Where the confirmation that the manipulation of the hardware per the instructions presented to the user is completed (YES determination) at block 540, the EC may continue with the method 500 by determining, at block 542, if all guided intervention steps had been completed. As described herein, the guided intervention process may include a plurality of steps for the user to follow in order to access and manipulate the hardware device such as the SATA device in this example. These steps may include instructions regarding how to first gain access to the SATA device. For example, certain steps may need to be followed by the user to remove a cover or chassis of the information handling system, remove a number of screws, actuate a number of latches and the like in order to gain physical access to the SATA device. Each of these steps may be presented to the user, one at a time, at block 535 until the EC has determined that all prescribed the steps of the guided intervention process have been completed at block 542. After each iteration of presenting instructs to the user as to how to manually manipulate the attached device (e.g., the PCIe card for example), the user may provide a confirmation of completion at block 540 and the EC may determine if all steps are completed or not at block 542.

Where the confirmation that the manipulation of the hardware device per the instructions presented to the user is completed (YES determination) at block 540 and the guided intervention steps are finished at block 542, the method may continue to block 550 to determine whether all attached devices to a power rail indicating an issue or whether any other power rails had been tested. In this embodiment, the power rails are operatively coupled to one or more devices that are to be checked by the EC in an attempt to resolve all issues. Where all of the devices or power rails have not been tested (NO determination) at block 550, the method 500 may return to block 510 with the EC turning off a last power rail that was indicated as an issue and continuing with the processes described. As such, the EC may methodically check each device accessible to the EC for indicated issues detected in power sequencing during an attempted boot up that may prevent booting of the information handling system. The EC executing the guided diagnostic flow system code may guide the user to physically manipulate targeted hardware associated with devices detected as causing issues by the EC, and confirming that the issue has been resolved or need further diagnostics or service. Blocks 530, 535, 540, 542, and 544 are described in further detail in embodiments herein such as with regard to FIG. 7.

Where an improper current is not detected (NO determination) at block 545 and a hardware device was detected as being present at block 525, the method 500 may continue with again determining, at block 550, whether all devices on a power rail reporting an issue or all power rails have been tested. Where all power rails detected as having an issue in a power sequence have been tested (YES determination) at block 550, the EC may set a boot flag to notify the BIOS to execute a memory reference code and halt at block 555. A boot flag may include a value in a non-extended partition record that indicates to a boot loader which partition to boot. The memory reference code may be part of the firmware of a motherboard that determines how the memory (e.g., RAM) of the information handling system will be read and written. As described herein, because the processor may only access certain devices such as memory devices during the guided exhaustive diagnostic flow, the processor may communicate through the EC to the TCON in order to present any additional messages describing how to rectify those issues associated with those devices only accessible by the processor after execution of the BIOS. For example, where the information handling system includes a DIMM, the EC may direct the BIOS to be executed by the processor in order for the DIMM to be made accessible and subjected to the exhaustive diagnostic flow. In each instance of checking these processor-only accessible hardware devices, however, the EC may communicate directly to the TCON in order to present the instructions to the user as described herein. As such the method 500 may continue at block 560 with the EC starting the processor and initiating a memory reference code flow described herein and specifically in connection with FIG. 6 in order to check those processor-only accessible hardware devices. At this point, the method 500 may end.

Figure 6:
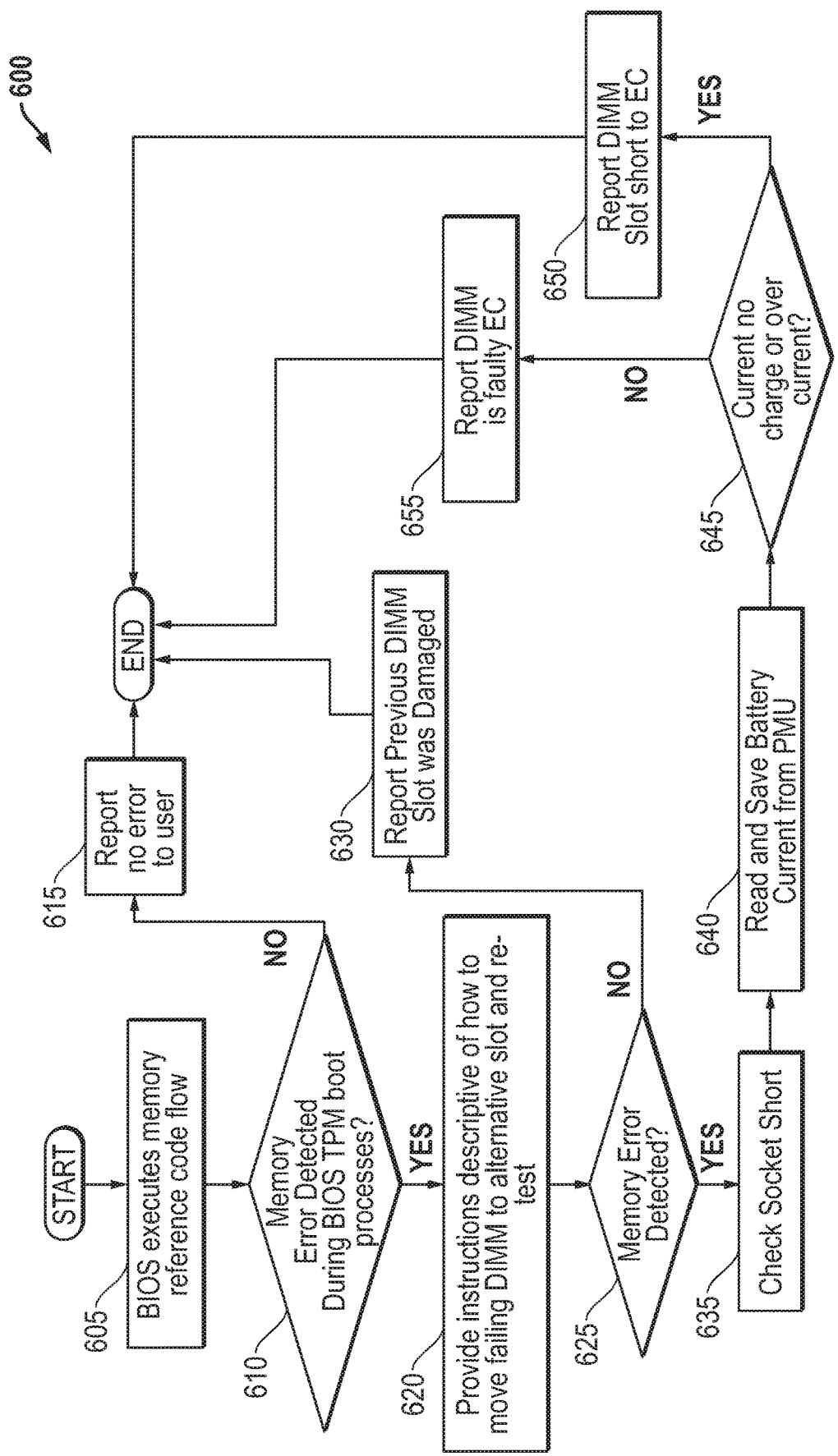
FIG. 6 is a flow diagram of a method of executing a memory reference code flow according to an embodiment of the present disclosure.

FIG. 6 is a flow diagram of a method 600 of executing a memory reference code assessment flow within operation of a guided diagnostic flow system according to an embodiment of the present disclosure. As described herein, the method 600 of FIG. 6 may form part of the methods 400 and 500 as described herein. The memory reference code may be, in an embodiment, a specific type of code associated with a detected issue associated with a memory device within the information handling system. In FIG. 6, the CPU may be powered on so that the memory devices may be accessed by the CPU and EC. As described herein, the processor or CPU and not the EC may access the memory devices during the guided exhaustive diagnostic flows described herein. The processor may communicate through the EC to the TCON in order to present any additional messages describing how to rectify those issues associated with those memory devices only accessible by the processor after execution of the BIOS. For example, where the information handling system includes a DIMM, the EC may direct the BIOS to be executed by the processor in order for the DIMM to be made accessible and subjected to the guided diagnostic flows described herein. In each instance of checking these processor-only accessible hardware devices, however, the EC may communicate directly to the TCON in order to present the diagnostic instructions to the user. Although the present example describes how the memory reference code may be addressed by any given method described herein, the present specification contemplates that similar reference codes may be generated to the EC for use by the TCON in order to display, at a display panel of a display device, specific instructions to the user in order to address any issue-experiencing memory devices. For ease of understanding in description, the memory devices described in connection with FIG. 6 may be a DIMM memory device operatively coupled to the information handling system via a memory slot.

The method 600 may include, at block 605, the BIOS executing a memory reference code flow. As described herein, although the EC may provide the TCON with an error code or other issue reference code, the EC may activate the processor in order to further check those issue-experiencing memory devices within the information handling system that may prevent a boot up of the information handling system. However, the present specification contemplates that the EC directly communicates with the TCON in order to facilitate the methods described herein.

The method 600 may further include determining, at block 610, whether a memory error is detected as the BIOS trusted platform module (TPM) ensures the boot process is completed. A memory error may be detected when any number of issues associated with the memory device or socket are detected. For example, a memory error may occur when a DIMM socket is experiencing a short, when the DIMM is not properly seated in the socket, and when the physical DIMM has degraded, among other errors.

Where no memory error was detected at block 610, the method 600 may continue with reporting that no memory error exists to the EC at block 615. In an embodiment, the EC may cause the TCON to display to a user that no memory error exists as described herein. At this point, the method 600 may end barring any other detected issue-experiencing hardware devices using the guided target or exhaustive diagnostic flows as described herein. In some embodiments, a manual intervention flow as described in connection with FIG. 7 herein prior to the processor being powered on by the EC and the memory reference code flow of FIG. 6 is initiated. This may allow the EC to address those hardware devices that may be detectable by the EC first before operating the processor.

Where a memory error was detected at block 610, the method 600 may continue with executing a guided intervention process at block 620. This guided intervention process at block 620 may be similar to those processes described in connection with FIG. 7. In the specific embodiment of FIG. 6, the EC, processor, or other processing device may have detected that a DIMM had failed in some way as described herein. At block 620, the guided intervention process may include the processor cooperating with the EC to send a memory error code to the TCON in order to present specific instructions to the user as to how to move the DIMM from a first slot in the information handling system to an alternative slot. The EC may provide any error code to the TCON that instructs the user via any graphics, messages, diagrams, or text as to how to manually manipulate the DIMM memory device. The TCON, in an embodiment, may cross-reference any error code from the EC at a table in a memory of the display device and retrieve data associated with that error code descriptive of what graphics, messages, diagrams, or text to display. In an embodiment, the data defines any number of graphics, messages, diagrams, or text that may include a plurality of steps or instructions a user may follow to fix the issue detected by the EC. Additionally, or alternatively, the image may include a logo that matches a logo on the hardware the user is to manipulate so that the user may visually identify the hardware during this manual manipulation process at block 620. Any other visual aids may also be presented to the user and the present specification contemplates that any information may be presented at the frame buffer in order to provide output to the user, visually, on the display panel of the display device. As the user completes each step, the user may indicate to the EC that the step is completed by, for example, actuating a button or switch on the information handling system. At this point any new instructions may be presented to the user in order to further instruct the user to complete the guided intervention process. In this case, the instructions may include graphics, messages, diagrams, or text or a series of graphics, messages, diagrams, or text that instruct the user to move the DIMM device indicated as failing from a first slot to an alternative slot. In specific examples, the set of instructions presented to the user may include instructions on how to remove a cover or chassis of the information handling system, instructions related to how to disengage the DIMM device from the first slot, and replace the DIMM device at an alternative slot, among other potential instructions. Once the DIMM, in this embodiment, is moved from the first slot to the alternative DIMM slot, the DIMM device may be retested.

In an embodiment, the EC or processor may cause power to be removed from the power rail powering the DIMM device so that, during this manipulation of the DIMM device, the user is not injured via electric shock or the DIMM device is not damaged. When the power is turned off on the power rail coupled to the DIMM device, the user receives the described instructions descriptive of how to manually manipulate the DIMM device and, again, indicate that the manual manipulation is complete by actuating a key or button. The EC may therefore monitor for this indication from the user and will not proceed with the method 600 until such confirmation is received from the user.

In the specific embodiment of FIG. 6, the method 600 may include enabling the device (e.g., DIMM). The DIMM is enabled by providing power to the power rail associated with the DIMM device. This allows the EC to, at block 625, detect the new socket location of the DIMM device, and detect if the memory error is still present. Where the error code is no longer present, the EC reports to the processor that, for example, the issue was with the first socket potentially being damaged, having a connection issue, or some other defect associated with the first slot. The processor may note this for future reference when executing a guided intervention process and the method 600 may end. Additionally, or alternatively, the user may be notified that the issue was with the first socket and that, if additional DIMM devices are to be added to the information handling system in the future, the first socket must be repaired.

Where the memory error is still detected at block 625, the EC and processor may then determine whether a short is detected at the new socket. The method 600 here includes reading and saving a current from the battery via a current sensor at, for example, the PMU at block 640. In an embodiment, the EC may instruct, via the TCON and display panel, the user to remove all DIMM devices in preparation for this measurement of current. The current is again read at block 645 and a comparison is made between this new current measurement and the current measurement made prior to the removal of the DIMM device. Where the current did change or had changed more than was expected, this may indicate on overcurrent or undercurrent state and the method 600 may end here with the EC reporting to the processor that the DIMM device is defective. In an embodiment, the EC may provide a DIMM slot sort error code to the TCON so that the TCON can display an appropriate message to the user indicating that the DIMM slot has a short and may need additional repair beyond what can be accomplished by the user manually. Where there is either no charge detected or an overcharge is detected at block 645, the EC may report that the alternative memory slot has a short at block 650 and the method 600 may end.

Where the current does not change at all or had not changed more than was expected, the method 600 may include sending a sending a faulty DIMM error code from the EC to the TCON at block 655. The TCON may display to the user a message or other indication that the DIMM is faulty. The user may choose to purchase another DIMM device as a replacement or to send the information handling system to a repairman or the manufacturer for them to address. The method 600 may end here.

Figure 7:
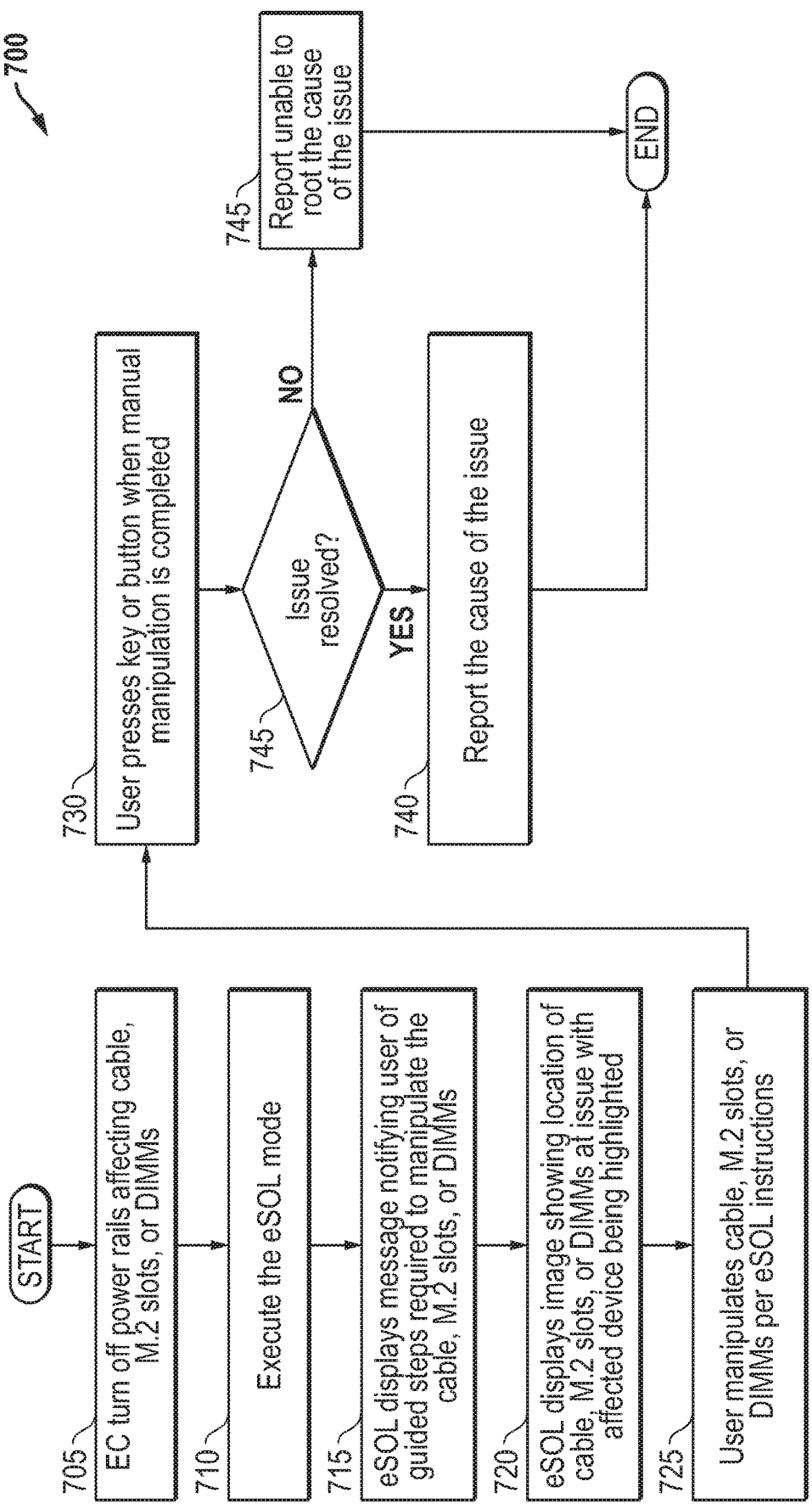
FIG. 7 is a flow diagram illustrating a method of executing an intervention flow according to an embodiment of the present disclosure.

FIG. 7 is a flow diagram illustrating a method 700 of executing a guided intervention flow according to an embodiment of the present disclosure. The method 700 described herein may be specific to certain types of devices such as cards such as PCIE card, cables, M.2 device slots, processors, and memory devices such as DIMMs among others that are part of the diagnostics conducted by the guided diagnostic flow system via the EC in the embodiments herein. Such devices may be accessible to the user and may be manipulated by the user during this guided intervention flow.

The method 700 may include, at block 705, with the EC turning off power to the power rails that affect the cables, M.2 device slots, and/or the DIMMs or other systems or components. By doing so, the EC assures that the user does not damage these devices as the user manipulates them according to the instructions provided to the user by the TCON at the display device. Additionally, by turning off the power, the components will not be damaged by manipulation or the user will not be injured via, for example, an electric shock.

The method 700 further includes executing, at block 710, the eSOL process as described herein. This eSOL process may be part of an information handling system's 100 pre-boot sequence. If the eSOL process is successfully completed, a bootstrap loader (e.g., BIOS 126) is invoked to load an operating system. Where issues are discovered during this eSOL process that prevents booting of the operating system, the information handling system 100 in the present specification may initiate the guided intervention flow as part of any of the guided diagnostic flows described herein: the exhaustive guided diagnostic flow, the targeted guided diagnostic flow, or the memory reference code flow.

The method 700 may continue at block 715 with the eSOL process, via executing the EC, displaying message or instructions notifying user of manual steps required to manipulate the cable, M.2 slots, or DIMMs. In an embodiment, the EC may then send a command or error code to the TCON so that the TCON 236 displays any of a plurality of error messages, images, logos, and instructions related to an issue found in connection with the cables, M.2 device slots, and DIMMs, processors (e.g., CPU or GOU), integrated circuits (ICs), printed circuit boards (PCBs), or other components. The messages provide information about the issue detected by the EC as well as specific instructions for the user to physically manipulate any of a plurality of these components of the information handling system. For example, as previously described, the EC may instruct, using certain signaling connections, the TCON to assemble a splash screen (e.g., a logo, an image, and one or more error messages) in the frame buffer and then instruct the TCON to transfer the contents of the frame buffer to the display panel of the display device using, for example, direct memory access (DMA). In an embodiment, the instructions sent by the EC and received by the TCON as may use the I²C (or similar) protocol.

The method further includes, at block 725, the user manipulating the cables, M.2 device slots, DIMMs, processors (e.g., CPU or GPU), integrated circuits (ICs), printed circuit boards (PCBs), or other components as instructed at the display device and particular to the components or device in the information handling system being diagnosed or manipulated. This manipulation may include a series of steps that may be detailed in any manner at the display device. Once the manual manipulation is completed, the user presses a key or button at block 730 indicating to the EC that the user has completed the process. For example, a keyboard key or on/off button may be actuated by the user at block 730. The EC may then, at block 735, determine whether the issue is resolved. The issue may be resolved when the EC and or other processing device no longer detects that any hardware device operatively coupled to any power rail is experiencing issues during the eSOL process descried herein. In an embodiment, the issue is resolved when an overcurrent or undercurrent is no longer detected at a power rail associated with any of the hardware devices within the information handling system. In another embodiment, the issue is resolved when all devices operatively coupled to all rails is detected by the EC or other processor.

Where the issue is resolved (YES determination) at block 735, the EC reports the cause of the issue 740 to the processor and the method 700 may end here. Where the issue was not resolved (NO determination) at block 735, the EC may report, at the display device via the TCON, that the root cause of the issue has not been resolved at block 745.

The blocks of the flow diagrams of FIGS. 3 through 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of instructing a user prior to a boot-up process of an information handling system, comprising:

with an embedded controller (EC) of the information handling system, executing a guided diagnostic flow module to:

determine that a power-on process has been initiated at the information handling system;

determine whether the EC detected a power sequencing timeout during boot up; and determine at which power rail boot-up has hung during the power-on process; and where the EC either determines that the power sequencing timeout has occurred, determining a fault at an issue-experiencing hardware component operatively coupled to the determined power rail;

sending a message from the EC to a timing controller (TCON) of a display panel of the information handling system, to initiate a guided diagnostic flow, the guided diagnostic flow including:

providing, at the display panel via the TCON, diagnostics steps from flash memory as instructions to the user of the information handling system to guide the user to perform a manual manipulation of the issue-experiencing hardware component of the information handling system to address the fault.

2. The method of claim 1, wherein determining a fault at the issue-experiencing component results from a detection, by the EC that one more hardware components at a power rail of the information handling system are not visible.

3. The method of claim 1, wherein determining a fault at the issue-experiencing component results from a detection, by the EC of an unexpectedly large current increase at a power on the power rail while testing the issue-experiencing hardware component.

4. The method of claim 1, wherein the guided diagnostic flow further comprises:

copying the one or more instructions stored on the flash memory device that is accessible to the TCON to create a composite bitmapped image on the display panel subsequent to transferring the bitmapped image via a direct memory access to a frame buffer associated with the display panel.

5. The method of claim 1, wherein the guided diagnostics flow further comprises:

presenting a description, via the display screen, that a first hardware component within the information handling system is to be manipulated to determine further if the first hardware component is the issue-experiencing hardware component;

with the EC, removing power to the first hardware component in anticipation of the user's manipulation of the first hardware component; and restoring power to the first hardware component after the EC receives a signal, via an input device, that the user has manipulated the first hardware component per the instructions presented on the display panel.

6. The method of claim 1, wherein the guided diagnostic flow further comprises:

activating a central processing unit (CPU) to operate a Basic Input/Output System (BIOS);

detecting a memory reference code from the BIOS to detect a memory error code at a dual in-line memory module (DIMM) operatively coupled to the EC;

providing diagnostics steps as guided instructions to the user specific to moving the DIMM from a first slot to a second slot within the information handling system;

receiving a signal from an input device that the DIMM has been moved to an alternative slot within the information handling system; and determining whether there is still the memory error code at the DIMM, and if not then reporting to the user that the first slot is damaged upon detection that the DIMM is operable.

7. The method of claim 1, wherein the guided diagnostic flow further comprises:

activating a central processing unit (CPU) to operate a Basic Input/Output System (BIOS);

detecting a memory reference code from the BIOS representative of a detected memory error code at a dual in-line memory module (DIMM) operatively coupled to the EC;

reading and saving a battery charge current detected at a battery of the information handling system;

providing diagnostics steps as guided instructions to the user specific to removing the DIMM from slots within the information handling system;

receiving a signal from an input device that the DIMM has been removed;

reading and saving the battery charge current after removing the DIMM; and where the battery charge current did not change after removing the DIMM, reporting a DIMM socket short to the user and instruct the user to move the DIMM to a second memory slot.

8. The method of claim 1, wherein providing diagnostics steps as instructions includes:

presenting a first guided instruction to the user to direct the user to perform a manual manipulation of a first issue-experiencing hardware component of the information handling system;

remove power from the first issue-experiencing hardware component;

receiving a signal that the user has completed the manipulation;

rechecking to determine whether issues still remain in relation to the operation of the first issue-experiencing hardware component; and where no issue remains in relation to the operation of the first issue-experiencing hardware component, display a notice to the user of the issue status, and checking the operation of a second hardware component to determine if the second hardware component has an operational issue.

9. An information handling system for implementing a computer guided resolution during a boot failure, comprising:

a processor;

a memory;

an embedded controller to initiate an execution of a guided diagnostic flow module to:

determine that a power-on process has been initiated at the information handling system;

determine whether the EC detected a power sequencing timeout; or determine whether an established hotkey has been actuated during the power-on process to initiate a guided diagnostic flow, the EC to target the guided diagnostic flow to hardware components on a power rail interrupted when a power sequencing time-out, the EC to initiate the guided diagnostic flow to iteratively test plural components on the power rails of a boot-up power sequencing; and a timing controller (TCON) of a display panel of the information handling system to receive a message from the EC initiating a guided diagnostic flow, the guided diagnostic flow including:

diagnostics steps, presented at the display panel via the TCON, as instructions to the user of the information handling system to direct the user to perform a manual manipulation to diagnose an issue-experiencing hardware component of the information handling system.

10. The information handling system of claim 9, wherein the EC an unexpectedly large current increase at a power rail via a power management unit to diagnose which hardware component is the issue-experiencing hardware component.

11. The information handling system of claim 9, wherein an I2C protocol bus is used to present the guided instructions to the user at the display panel via the TCON.

12. The information handling system of claim 9, wherein the guided diagnostic flow presented via the TCON further comprises:
   one or more instructions stored on a flash memory device that is accessible to the TCON;
   the one or more instructions used by the TCON to create a composite bitmapped image of guided instructions and a hardware component image on the display panel subsequent to transferring the bitmapped image via a direct memory access to a frame buffer associated with the display panel.

13. The information handling system of claim 9, wherein the guided diagnostic flow further comprises:
   presenting a description, via the display screen, that a first hardware component within the information handling system is to be manipulated;
   with the EC, removing power to the first hardware component in anticipation of the manual manipulation of the first hardware component; and
   restoring power to the first hardware component after the EC receives a signal, via an input device, that the user has manipulated the first hardware component per the instructions presented on the display panel to diagnose whether the first hardware component is the issue-experiencing component.

14. The information handling system of claim 9, wherein the guided diagnostic flow further comprises:
   detecting a memory reference code from the BIOS to detect a memory error code at a dual in-line memory module (DIMM) operatively coupled to the EC;
   providing guided diagnostics steps as instructions to the user specific to moving the DIMM from a first slot to a second slot within the information handling system;
   receiving a signal from an input device that the DIMM has been moved to an alternative slot within the information handling system;
   reporting to the user that the first slot is damaged upon detection that the DIMM is operable; and
   reporting to the user that the DIMM is damaged upon detection of a memory error code.

15. The information handling system of claim 9, wherein the guided diagnostic flow initiated via actuation of a hot key iteratively determines whether a particular hardware component of a plurality of hardware components of the information handling system is the issue-experiencing and further comprising:
   reading and saving a battery charge current detected at a power management unit (PMU) for each of a plurality of power rails;
   providing guided diagnostic steps to manipulate a first hardware component on a first power rail of a boot-up sequence and read and save the battery charge current after received input instructing the manipulation; and
   where the battery charge current did not change after manipulating the first hardware component, providing guided diagnostic steps to manipulate a second hardware component.

16. The information handling system of claim 9, wherein providing diagnostics steps as instructions includes:
   presenting a first guided instruction to the user to direct the user to perform a manual manipulation of a first hardware component of the information handling system;
   remove power from the first hardware component;
   receiving a signal that the user has completed the manipulation;
   rechecking to determine whether issues still remain in relation to the operation of the first hardware component; and
   where no issue remains in relation to the operation of the first hardware component, checking the operation of a second hardware component to determine if the second hardware component has an operational issue.

17. An embedded controller (EC) executing code of a guided diagnostic flow for instructing a user during a boot-up process of an information handling system to assess issues with the boot-up process, comprising:
   a central processing unit (CPU), a memory, power management unit (PMU);
   a non-transitory storage medium; and
   an embedded controller (EC) executing code instructions of a diagnostic flow module to determine that a power-on process has been initiated at the information handling system;
   the EC to detect a power sequencing timeout or to determine whether an established hotkey has been actuated during the boot process; and
   the EC, upon either detected a power sequencing timeout or the actuation of the hotkey, sending a message to a timing controller (TCON) of a display panel of the information handling system, to initiate the guided diagnostic flow, to display, at the display panel via the TCON whether or not the CPU is operating, diagnostics steps as guided instructions to the user of the information handling system to direct the user to perform a manual manipulation to diagnose an issue-experiencing hardware component of the information handling system causing a boot-up process error.

18. The computer program product of claim 17, wherein code initiation of the guided diagnostic flow is further configured to:
   copy, via the TCON, the one or more guided instructions or images stored on a flash memory device that is accessible to the TCON to create a composite bit-mapped image of the guided instructions or images on the display panel subsequent to transferring the bit-mapped image via a direct memory access to a frame buffer associated with the display panel.

19. The computer program product of claim 17, further comprising:
   the code instructions of the guided diagnostic flow further configured to:
   present a description, via the display screen, that a first hardware component within the information handling system is to be manipulated;
   the EC to remove power to the first hardware component via the PMU in anticipation of the user's manipulation of the first hardware component; and
   restore power to the first hardware component after the EC receives a signal, via an input device, that the user has manipulated the first hardware component per the instructions presented on the display panel.

20. The computer program product of claim 17, wherein the guided instructions to the user includes an image of a first hardware component to be manipulated highlighted to assist a user in locating or accessing the first hardware component to determine if the first hardware component is the issue-experiencing hardware component.

* * * * *